(12) United States Patent
Atake et al.

(10) Patent No.: US 9,635,409 B2
(45) Date of Patent: Apr. 25, 2017

(54) PLAYBACK DEVICE, PLAYBACK METHOD, AND RECORDING MEDIUM

(71) Applicant: SONY CORPORATION, Tokyo (JP)

(72) Inventors: Yoshinori Atake, Kanagawa (JP); Ryo Yoshida, Kanagawa (JP)

(73) Assignee: CHIP LAW GROUP, Tokyo (JP)

( * ) Notice: Subject to any disclaimer, the term of this patent is extended or adjusted under 35 U.S.C. 154(b) by 0 days.

(21) Appl. No.: 14/654,811

(22) PCT Filed: Dec. 19, 2013

(86) PCT No.: PCT/JP2013/007457
§ 371 (c)(1),
(2) Date: Jun. 22, 2015

(87) PCT Pub. No.: WO2014/103255
PCT Pub. Date: Jul. 3, 2014

(65) Prior Publication Data
US 2015/0358666 A1    Dec. 10, 2015

(30) Foreign Application Priority Data

Dec. 28, 2012  (JP) .................................. 2012-286724

(51) Int. Cl.
| | |
|---|---|
| *H04N 7/173* | (2011.01) |
| *H04N 21/41* | (2011.01) |
| *H04N 21/439* | (2011.01) |
| *H04N 21/414* | (2011.01) |
| *H04N 21/422* | (2011.01) |
| *H04N 21/4227* | (2011.01) |

(Continued)

(52) U.S. Cl.
CPC ... *H04N 21/4122* (2013.01); *H04N 21/41407* (2013.01); *H04N 21/4227* (2013.01); *H04N 21/42207* (2013.01); *H04N 21/4307* (2013.01); *H04N 21/4396* (2013.01); *H04N 21/43615* (2013.01); *H04N 21/47217* (2013.01); *H04N 21/6587* (2013.01)

(58) Field of Classification Search
CPC ............. H04N 21/4122; H04N 21/414; H04N 21/42207; H04N 21/4227
See application file for complete search history.

(56) References Cited

U.S. PATENT DOCUMENTS

2009/0070840 A1    3/2009   Kamimaki
2011/0295974 A1 *  12/2011  Kashef ................ H04L 65/1073
                                                                709/217

FOREIGN PATENT DOCUMENTS

| EP | 1796389 A2 | 6/2007 |
|---|---|---|
| JP | 2006-332811 A | 12/2006 |

(Continued)

*Primary Examiner* — Olugbenga Idowu
(74) *Attorney, Agent, or Firm* — Chip Law Group

(57) ABSTRACT

An information processing system includes a control processor that causes playback of a selected content on a first display screen. The control processor also receives a request to play back the selected content on a second display screen, and requests playback of the selected content on the second display screen. The control processor then continues playback of the selected content on the first display screen after the request to play back the content on the second display screen is received, and automatically stops playback of the selected content on the first display screen during playback of the selected content on the second screen.

18 Claims, 18 Drawing Sheets

(51) Int. Cl.
*H04N 21/43* (2011.01)
*H04N 21/436* (2011.01)
*H04N 21/472* (2011.01)
*H04N 21/6587* (2011.01)

(56) References Cited

FOREIGN PATENT DOCUMENTS

JP 2008-165333 A 7/2008
WO 2011-150208 A2 12/2011

\* cited by examiner

PLAYBACK DEVICE, PLAYBACK METHOD, AND RECORDING MEDIUM

TECHNICAL FIELD

The present technology relates to a playback device, a playback method, and a recording medium. More particularly, the present technology relates to a playback device, a playback method, and a recording medium in which a playback between devices is performed without giving a feeling of strangeness to a user when a plurality of devices perform a playback of a video or the like in collaboration with each other.

BACKGROUND ART

In recent years, with the spread of a network at home, for example, a collaborated playback in which a video being played back through a device A is handed over to and played back by a device B is performed. In Patent Literatures 1 and 2, techniques of changing a playback destination of a content such as a video between devices connected via a network have been proposed.

CITATION LIST

Patent Literature

[PTL 1]
JP 2006-332811 A
[PTL 2]
JP 2008-165333 A

SUMMARY OF INVENTION

Technical Problem

Let us assume a video A being played back by the device A is handed over to and played back by the device B connected to the same network as a network to which the device A is connected. In this case, when an instruction to perform a playback of the video A is given from the device A to the device B, the device A starts a process of stopping the playback of the video A, and the device B starts a process of starting the playback of the video A.

In order to start the playback of the video A, the device B has to perform processes such as activation, acquisition of information such as a storage location of the video A, access to the storage location, and specifying of a position at which the playback of the video A starts. It takes some time to perform such a series of processes, and it is not completed instantaneously.

A period of time during which the video A is provided to the user in neither the device A nor the device B occurs until the playback of the video A starts in the device B after the playback of the video A stops in the device A. When a period of time during which the video A is not provided occurs, the user may have various feelings such as an uneasy feeling that an operation may not be normally accepted or impatience on a situation in which a video is not provided, which is not preferable. Thus, it is desirable to solve a period of time during which a video is not provided.

The present technology has been made in light of the foregoing, and it is desirable to cause the playback of a content to transition between devices without interruption in the playback of a content.

Solution to Problem

In a first aspect, an information processing system, includes a control processing unit that causes playback of a selected content on a first display screen. The control processing unit also receives a request to play back the selected content on a second display screen, and requests playback of the selected content on the second display screen. Then the control processing unit continues playback of the selected content on the first display screen after the request to play back the content on the second display screen is received, and automatically stops playback of the selected content on the first display screen during playback of the selected content on the second screen.

In another aspect, an information processing method includes causing playback of a selected content on a first display screen, and receiving a request to play back the selected content on a second display screen. The method also includes requesting playback of the selected content on the second display screen, and continuing playback of the selected content on the first display screen after the request to play back the content on the second display screen is received. The method further includes automatically stopping playback of the selected content on the first display screen during playback of the selected content on the second screen.

In a further aspect, a non-transitory computer-readable medium encoded with computer-readable instructions that when executed by a computer cause the computer to perform a method that includes causing playback of a selected content on a first display screen, and receiving a request to play back the selected content on a second display screen. The method also includes requesting playback of the selected content on the second display screen, and continuing playback of the selected content on the first display screen after the request to play back the content on the second display screen is received. The method further includes automatically stopping playback of the selected content on the first display screen during playback of the selected content on the second screen.

In a still further aspect, an information processing system includes a server that stores content, a first device that plays back content, a second device configured to playback content, and a network that interconnects the server, first device and second device. When the first device receives a request to switch playback of a selected content from the first device to the second device, the first device provides a content location of the selected content on the server to the second device via the network, sends, via the network, a request to the second device to start playback of the selected content, continues playback of the selected content after sending the request to the second device, and stops playback of the selected content during playback of the selected content on the second device. The second device receives, via the network, the location of the selected content on the server, receives, via the network, the request to start playback of the selected content, accesses, via the network, the selected content on the server, prepares playback of the selected content, and plays back the selected content.

Advantageous Effects of Invention

According to an aspect of the present technology, it is possible to cause the playback of content to transition between devices without interruption in the playback of content.

DESCRIPTION OF EMBODIMENTS

Figure 1:
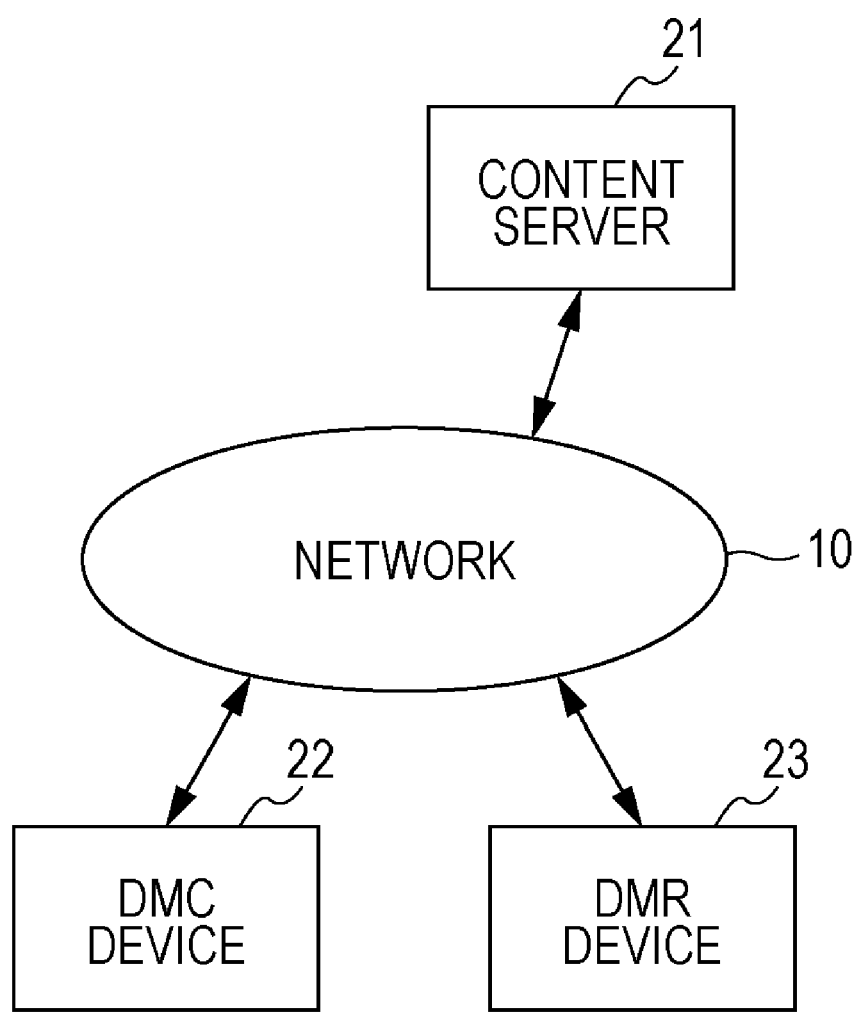
FIG. 1 is a diagram illustrating a configuration of a system according to an embodiment.

Hereinafter, a mode (hereinafter, referred to as an "embodiment") carrying out the present technology will be described. The description will proceed in the following order.
1. Overall configuration of system
2. Configuration of content server
3. Configuration of DMC device
4. Configuration of DMR device
5. First process related to playback transition
6. Second process related to playback transition
7. Third process related to playback transition
8. Fourth process related to playback transition
9. Fifth process related to playback transition
10. Selection of playback method <Overall Configuration of System>

FIG. 1 is a diagram illustrating a configuration of a system according to an embodiment of the present technology. The system illustrated in FIG. 1 includes a network 10, a content server 21, a DMC device 22, and a DMR device 23.

The network 10 may be a wired network, a wireless network, a network in which a wired network is mixed with a wireless network. The content server 21 manages contents such as videos, still images, and music, and provides contents to a device connected thereto via the network 10. The content server 21 functions as a digital media server (DMS), and has a function of distributing a content held in another corresponding device via the network 10.

The DMC device 22 is a digital media controller and has a function of accessing the content server 21 and selecting a content desired to be played back and a function of selecting a device that is to play back the content. For example, the DMC device 22 has a function of outputting an instruction for playing back a content A held in the content server 21 by the DMR device 23.

The following description will proceed with an example in which the DMC device 22 has a function of playing back a content, and a content being played back through the DMC device 22 is handed over to and played back by the DMR device 23. The DMR device 23 is a digital media renderer and has a function of receiving a command from the DMC device 22 and playing back content.

When content managed by the content server 21 is played back by the DMC device 22, and the playback of the content is handed over to and performed by the DMR device 23, a digital living network alliance (DLNA) may be applied. In the DLNA guideline, a digital media server (DMS) that records, accumulates, and provides contents and a digital media player (DMP) that plays back the contents are specified. The DMS and the DMP can be used when connected to a network, and the DMP searches for the DMS located within the network and acquires a list of available contents.

When the user selects a content desired to watch from the prepared list, the content is provided from the DMS. A personal computer, a home server, a digital versatile disc (DVD)/hard disk drive (HDD) recorder, or the like is considered as the DMS, and a television receiver, a laptop personal computer, a personal digital assistant (PDA), or the like is considered as the DMP. A single device may have all of a plurality of functions, and the DMC device 22 has the functions of the DMC and the DMP, and the DMR device 23 has the function of the DMR and the DMP.

Here, the description will continue under the assumption that the DMC device 22 is, for example, a smart phone or a tablet type personal computer, and the DMR device 23 is a television receiver. Further, the description will continue under the assumption that the content server 21 is a personal computer.

FIG. 1 illustrates an example in which the single content server 21, the single DMC device 22, and the single DMR device 23 are connected to the network 10, but the number of the content servers 21, the number of the DMC devices 22, and the number of the DMR device 23 may be two or more, and a plurality of content servers 21, a plurality of DMC devices 22, and a plurality of DMR devices 23 may be connected to the network 10.

<Configuration of Content Server 21>

Figure 2:
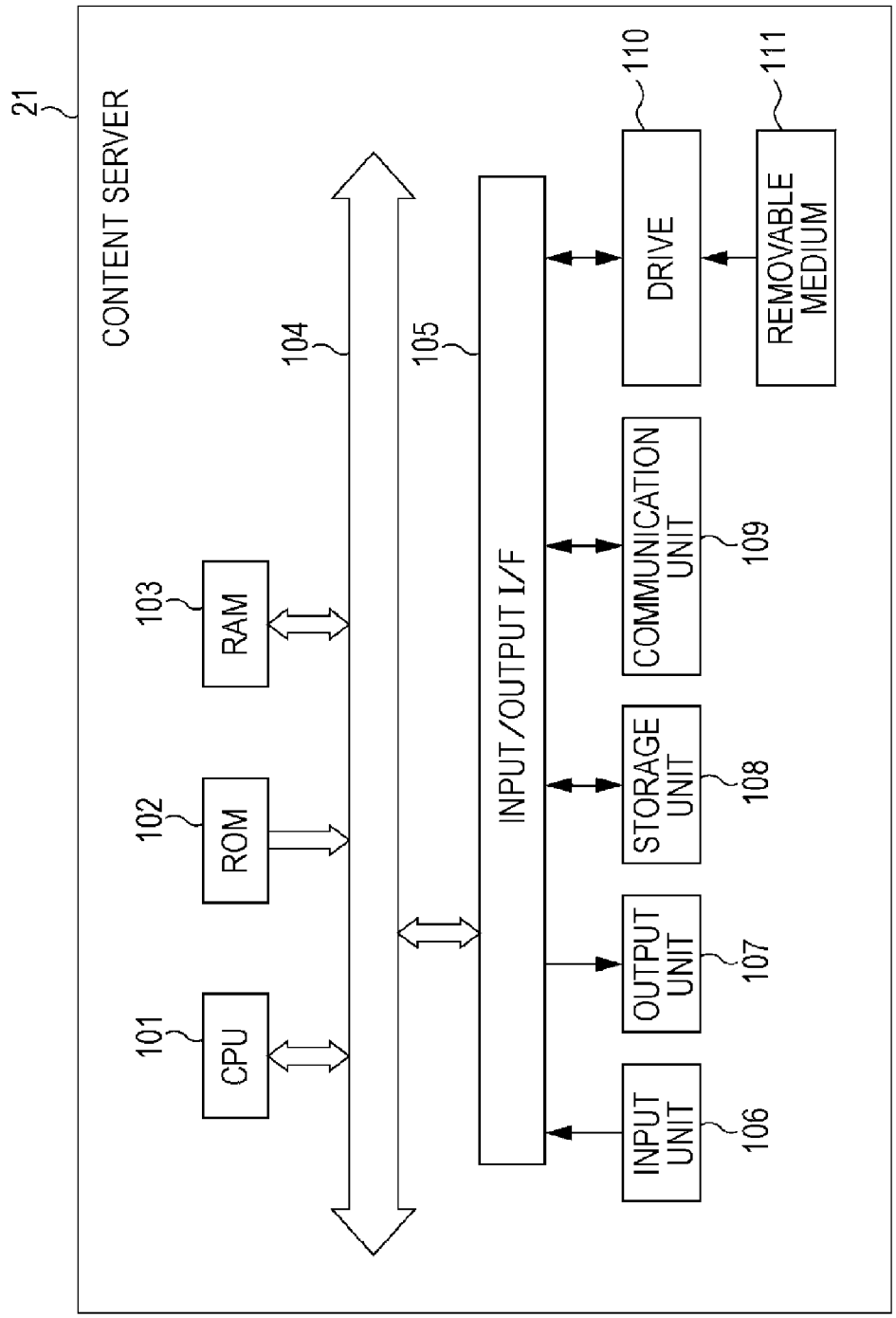
FIG. 2 is a diagram illustrating an exemplary configuration of a content server.

FIG. 2 is a block diagram illustrating the content server 21 configured with a personal computer. In the content server 21 illustrated in FIG. 2, a central processing unit (CPU) 101, a read only memory (ROM) 102, and a random access memory (RAM) 103 are connected to one another via a bus 104. An input/output (I/O) I/F 105 is connected to the bus 104. An input unit 106, an output unit 107, a storage unit 108, a communication unit 109, and a drive 110 are connected to the I/O I/F 105.

The input unit 106 includes a keyboard, a mouse, a microphone, and the like. The output unit 107 includes a display, a speaker, or the like. The storage unit 108 includes a hard disk, a non-volatile memory, or the like. The communication unit 109 includes a network interface or the like. The drive 110 drives a removable medium 111 such as a magnetic disc, an optical disc, a magneto optical disc, or a semiconductor memory.

In the computer having the above-described configuration, for example, the CPU 101 performs a series of processes by loading a program stored in the storage unit 108 in the RAM 103 through the I/O I/F 105 and the bus 104 and then executing the program.

Figure 3:
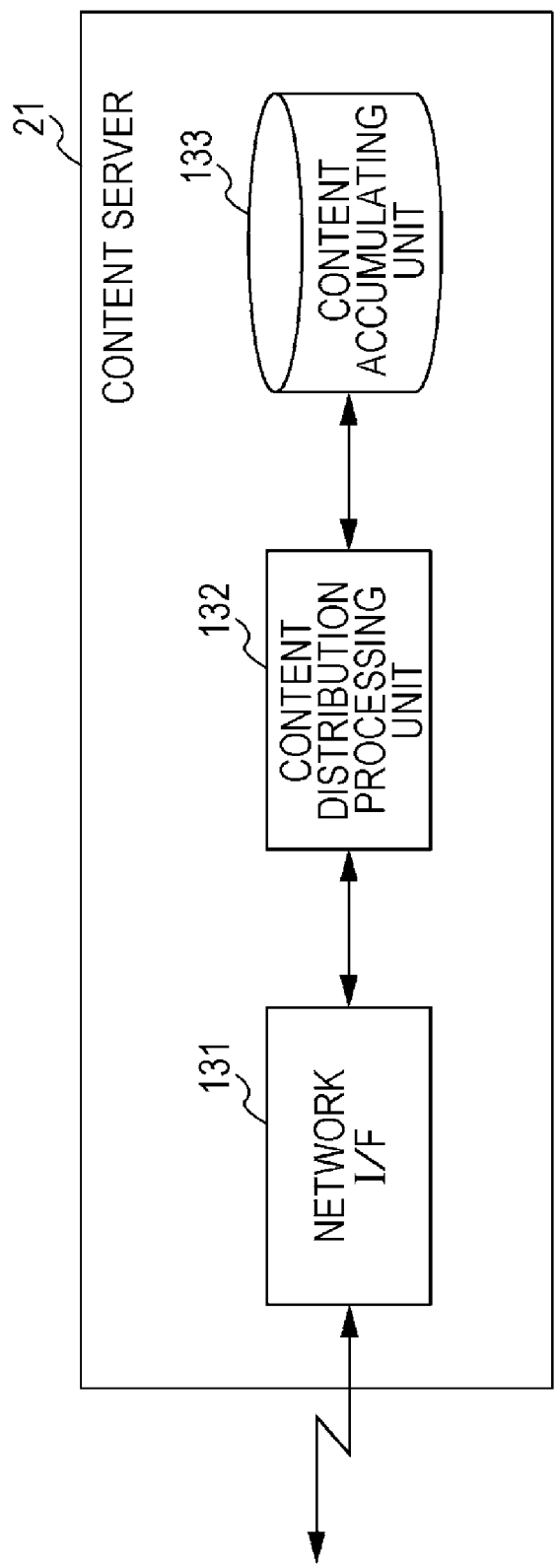
FIG. 3 is a diagram illustrating a function of a content server.

FIG. 3 is a functional block diagram of the content server 21. The content server 21 includes a network I/F 131, a content distribution processing unit 132, and a content accumulating unit 133. The content server 21 causes a video or audio content (hereinafter, referred to as a "content") received at home through BS digital, CS digital, terrestrial analog, or the Internet to be accumulated in the content accumulating unit 133 including a large-capacity accumulating medium illustrated in FIG. 2 such as a hard disk as streaming data.

The content server 21 reads and plays back the streaming data accumulated in the content accumulating unit 133 through the network I/F 131 in response to a distribution request transmitted from the DMC device 22 by using the content distribution processing unit 132, and distributes the streaming data to the DMC device 22 or the DMR device 23 of the request destination through the network I/F 131 in the streaming manner.

<Configuration of DMC Device 22>

Figure 4:
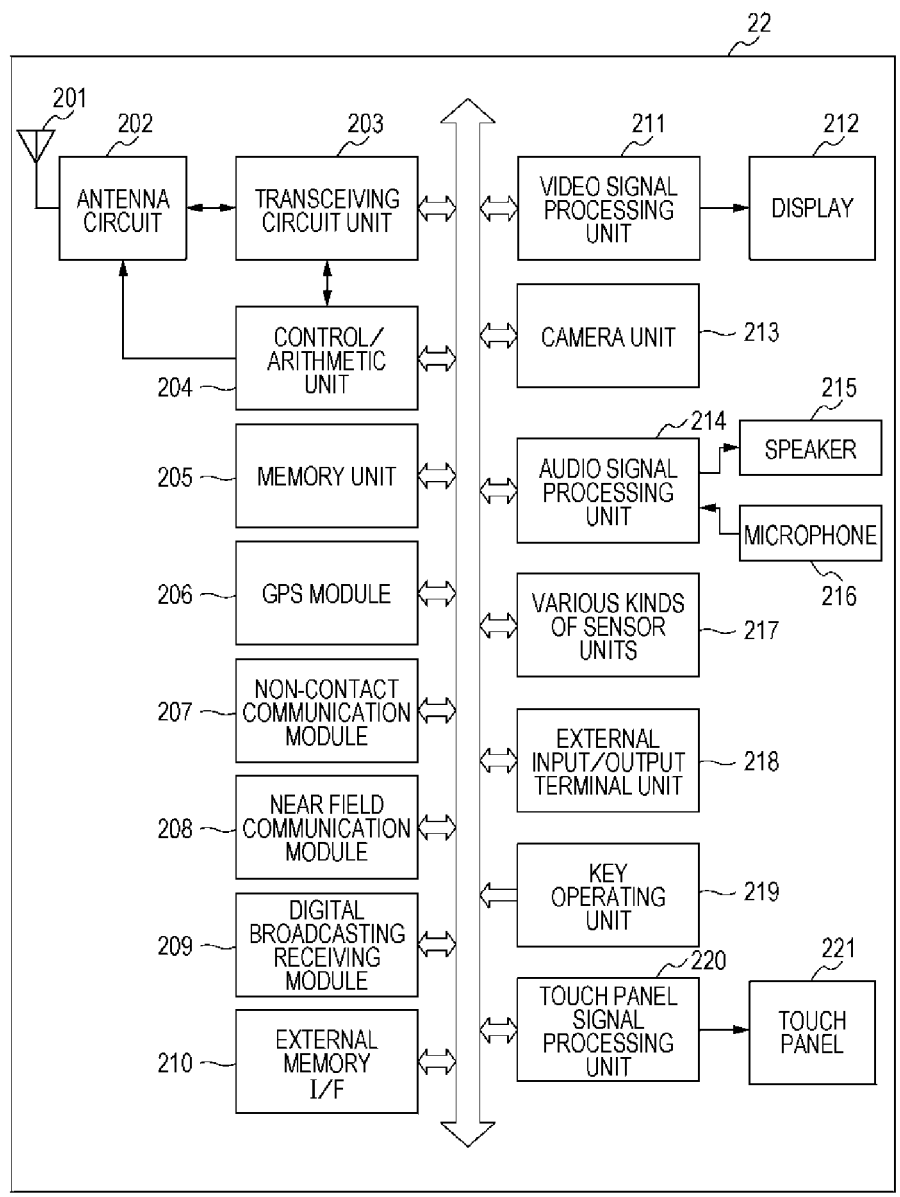
FIG. 4 is a diagram illustrating an exemplary configuration of a DMC device.

FIG. 4 is a block diagram illustrating the DMC device 22 configured with a tablet type personal computer. In FIG. 4, a communication antenna 201 is, for example, a built-in antenna, and performs transmission and reception of a phone call or an electronic mail via a mobile telephone network or a public wireless communication network, downloading of various application programs, and transmission and reception of a signal wave used to communicate with the Internet or the like. An antenna circuit 202 includes an antenna switch, a matching circuit, a filter circuit, and the like, and a transceiving circuit unit 203 performs frequency transform, modulation, and demodulation of a signal received or to be transmitted via a mobile telephone network or a public wireless communication network.

A control/arithmetic unit 204 includes a CPU, and controls components such as the transceiving circuit unit 203, a video signal processing unit 211, an audio signal processing unit 214, a global positioning system (GPS) module 206, a non-contact communication module 207, a near field communication (NFC) module 208, a digital broadcasting receiving module 209, an external memory I/F 210, a camera unit 213, various kinds of sensor units 217, an external I/O terminal unit 218, a key operating unit 219, and a touch panel signal processing unit 220, and performs various kinds of arithmetic operations as necessary.

The control/arithmetic unit 204 executes a control program or various kinds of application programs stored in a memory unit 205. In addition, the DMC device 22 includes components installed in a general information terminal such as a clock unit that measures a period of time or a time, a power management IC that controls a battery supplying electric power to the respective components and power of the battery.

The memory unit 205 includes a built-in memory installed inside the terminal, a removable memory of a card type, or the like. An example of the removable memory of the card type includes a card storing subscriber identity module (SIM) information or the like. The built-in memory includes a ROM and a RAM.

The ROM stores an operating system (OS), a control program used for the control/arithmetic unit 204 to control the respective components, various initial setting values, dictionary data, text prediction conversion dictionary data, various kinds of sound data, various kinds of application programs, or the like. The ROM includes a rewritable ROM such as a NAND-type flash memory or an electrically erasable programmable read-only memory (EEPROM), and stores electronic mail data, data of a telephone book or a mail address book, content data of a still image or a moving image, various user setting values, or the like. The RAM functions as a work area and a buffer area when the control/arithmetic unit 204 performs various kinds of data processing, and stores data as necessary.

The GPS module 206 includes a GPS antenna, and obtains a longitude and a latitude of a current position of its own terminal using a GPS signal from a GPS geodetic satellite. The GPS data (information representing the longitude and the latitude) obtained by the GPS module 206 is transferred to the control/arithmetic unit 204. The control/arithmetic unit 204 can detect the current position or movement of its own terminal based on the GPS data.

The non-contact communication module 207 performs non-contact communication used, for example, in so-called radio frequency-identification (RFID) or a non-contact type IC card through a non-contact communication antenna.

The NFC module 208 includes a communication antenna for a near field radio wave such as a wireless LAN or a Bluetooth (a registered trademark), and an NFC circuit. Various kinds of application programs may be acquired through the NFC module 208.

The digital broadcasting receiving module 209 includes an antenna and a tuner which are used to receive digital television broadcasting, digital radio broadcasting, or the like. The digital broadcasting receiving module 209 is configured not only to receive digital broadcasting of a single channel but also to receive digital broadcasting of two or more channels at the same time. The digital broadcasting receiving module 209 is configured to receive data multiplexed into digital broadcasting. For example, the digital broadcasting data received by the digital broadcasting receiving module 209 is configured to be compressed by the control/arithmetic unit 204 and then stored (recorded) in the memory unit 205 or the like. Further, various kinds of application programs may be transmitted as a piece of display broadcasting data.

The external memory I/F 210 includes an external memory slot in which a storage medium such as an external memory is removably mounted, an interface circuit for external memory data communication, and the like. Various kinds of application programs may be acquired through a storage medium such as an external memory inserted in the external memory I/F 210.

The video signal processing unit 211 includes a decompression decoding circuit that performs decompression decoding on compression-coded video data supplied from the control/arithmetic unit 204, a display panel driving circuit that causes a digital video which has been subjected to the decompression decoding, a digital broadcasting video received by the digital broadcasting receiving module 209, or the like to be displayed on a display panel 222, and the like. Further, the video signal processing unit 211 generates a video signal used to display a desktop image supplied from the control/arithmetic unit 204, various kinds of menu images, a virtual touch area image corresponding to the position on a touch panel, or the like, and causes the images to be displayed on the display panel 222.

The camera unit 213 includes an imaging element for capturing a still image or a moving image, an optical system, a peripheral circuit, a circuit for driving a light emitting shooting fill light, and the like. Still image data or moving image data obtained by shooting by the camera unit 213 is transferred to the video signal processing unit 211 as preview video data. A preview video is displayed on the display panel 222 based on the image data at the time of camera shooting. Further, when still image data or moving image data captured by the camera unit 213 is recorded, the captured still image data or moving image data is transferred to the control/arithmetic unit 204 and compressed, and then stored in an external memory connected to the memory unit 205 or the external memory I/F 210.

For example, a speaker 215 is used for a music playback, a received sound output, a ring back tone (ring tone) output, and the like. A microphone 216 is used for sound collection of an external sound, sound collection of a transmitted sound, or the like. The audio signal processing unit 214 includes an amplifying circuit for the speaker 215, an amplifying circuit for the microphone 216, a decompression decoding circuit that performs decompression decoding on compression-coded audio data supplied from the control/arithmetic unit 204, a digital/analog converting circuit that converts digital audio data that has been subjected to the decompression decoding into an analog audio signal, an analog/digital converting circuit that converts an analog audio signal input from the microphone 216 into digital audio data, a compression coding circuit that performs compression coding on the digital audio data, and the like.

The various kinds of sensor units 217 include various kinds of detecting sensors such as a terminal status detecting sensor that detects a status of a portable information terminal 1 according to the present embodiment, a peripheral circuit thereof, and the like. Examples of the various kinds of sensor units 217 include an inclination sensor, an acceleration sensor, a direction sensor, a temperature sensor, a humidity sensor, and an illuminance sensor. The detection signals generated by the various sensor units 217 are transferred to the control/arithmetic unit 204. The control/arithmetic unit 204 can detects a status of (an inclination, acceleration, a direction, a temperature, humidity, and illuminance, or the like) of the portable information terminal 1 based on the detection signal.

For example, the external I/O terminal unit 218 includes a cable connection connector used when data communication is performed through a cable, an external data communication interface circuit, a charging terminal when an internal battery is charged through a power cable or the like, a charging interface circuit, and the like. Various kinds of application programs may be acquired through the external I/O terminal unit 218.

The key operating unit 219 includes a hard key arranged on a housing, a peripheral circuit thereof, and the like. The key operating unit 219 converts a pressing operation input of the hard key performed by the user into an electrical signal, performs amplification and analog/digital conversion on the operation input signal, and transfers the operation input data which has been subjected to the analog/digital conversion to the control/arithmetic unit 204.

The touch panel 221 is an input operation unit having a detection face used to detect an operation input performed by the user, and includes a transparent touch screen sensor arranged on the entire surface of the display panel 222. The touch panel signal processing unit 220 measures, for example, a touch detection position and a touch trajectory from the touch panel 221, a touch duration time, and a touch time interval, and transfers the measured data to the control/arithmetic unit 204 as touch detection data. The touch panel 221 and the touch panel signal processing unit 220 support a so-called multi-touch operation.

Figure 5:
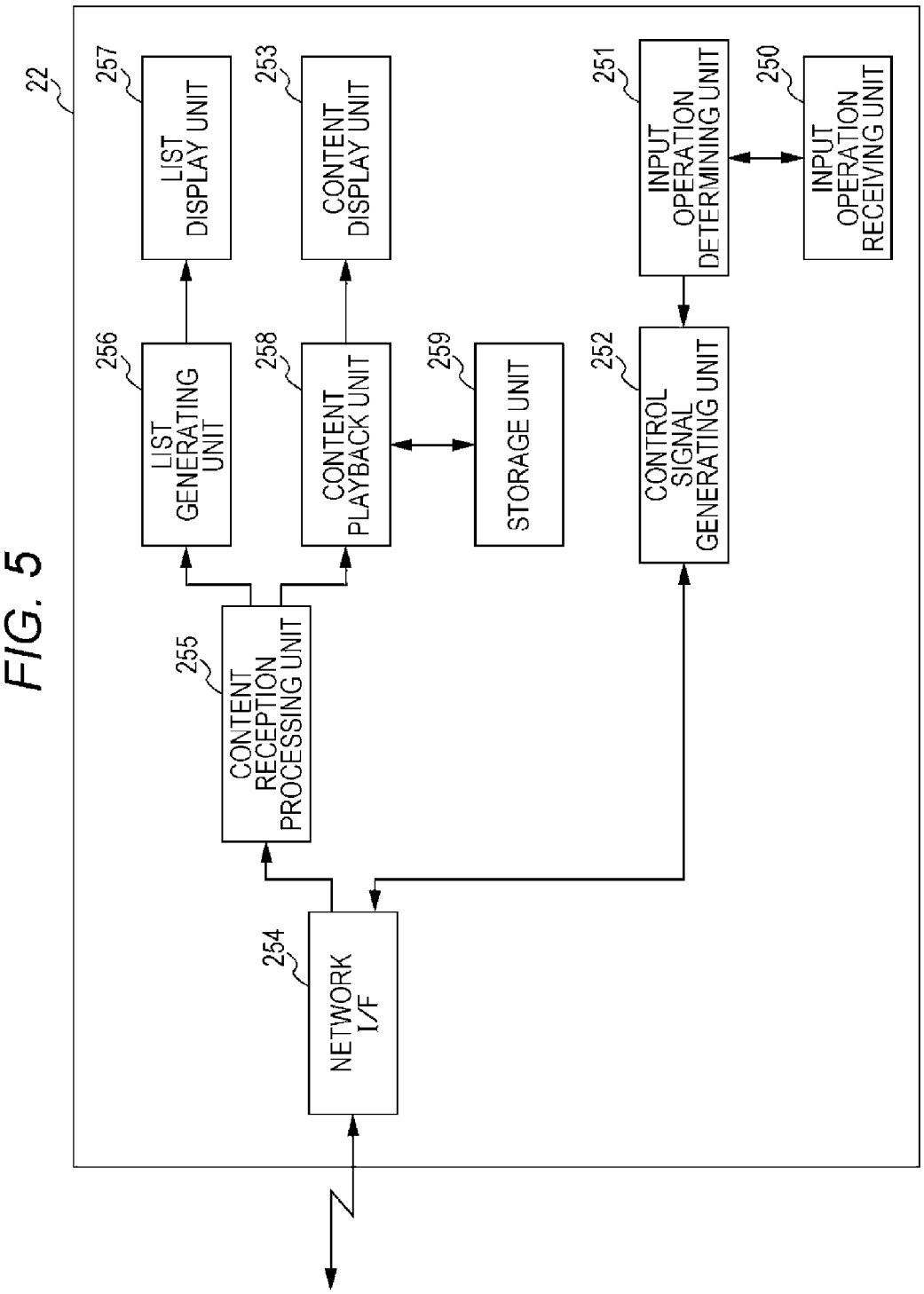
FIG. 5 is a diagram illustrating a function of a DMC device.

FIG. 5 is a functional block diagram illustrating the DMC device 22. The DMC device 22 functions as a remote controller that controls operation of the content server 21 and the DMR device 23 connected to the network 10. The DMC device 22 includes a display 212, and has a function of receiving and playing back content streaming distributed from the content server 21.

Specifically, the DMC device 22 controls exchange (transmission and reception or transfer) of video information between the respective components including the DMC device 22 itself, and controls a display of a video and a playback of a sound in the DMR device 23 and the DMC device 22. To this end, the DMC device 22 includes an input operation receiving unit 250 that receives an operation input made by the user and a control signal generating unit 252 that has a video information exchange signal generating function of generating an operation signal used to exchange video information between the respective components in response to the operation input as one function.

The DMC device 22 further includes a display unit 253 that displays video information which is played back in the streaming manner in response to the operation signal generated by the control signal generating unit 252. Further, the DMC device 22 according to this embodiment includes an audio playback function of playing back audio information, can listen to a sound through a head phone or an ear phone through a built-in speaker or a head phone terminal, and can be used as a display playback unit of displaying and playing back content.

The DMC device 22 further includes a network I/F 254 for performing wireless communication with a wireless LAN access point of the network 10 according to a predetermined protocol such as a protocol of IEEE802.11 scheme or an evolution of the protocol. The content server 21 further includes a content reception processing unit 255 that performs, for example, a process of receiving and demodulating information related to stored content or content data.

Further, a list generating unit 256 that generates a content list from information related to a content received and demodulated by the content reception processing unit 255 and a list display unit 257 that displays the list generated by the list generating unit 256 are provided.

Further, a content playback unit 258 that decodes and plays back content data received and demodulated by the content reception processing unit 255 and a storage unit 259 that stores the content data played back by the content playback unit 258 are provided. The content data played back by the content playback unit 258 is video-displayed through a content display unit 253. The content playback unit 258 also controls a display of a message to the user, a stop timing of content being played back, or the like.

The DMC device 22 further includes an input operation determining unit 251 that determines an input operation which is made by the user and received by the input operation receiving unit 250, and the input operation determining unit 251 is arranged between the input operation receiving unit 250 and the control signal generating unit 252.

The control signal generating unit 252 generates various kinds of control signals based on a determination result by the input operation determining unit 251 on a key input made such that the user, for example, presses, rotates, pushes up, or pushes down, for example, a button of the input operation receiving unit 250. As a concrete example of the generated control signal, there is a signal related to a playback start request that causes a desired playback device, for example, the DMR device 23 to start a streaming playback of content data stored in the content server 21.

Further, for example, there is a catch operation signal that causes content data being displayed on the DMR device 23 to be displayed on the display unit 253 of the DMC device 22.

In addition, the control signal generating unit 252 generates a content supply selection signal for selecting a desired content server 21 based on the user's input operation. Further, a content selection signal for selecting a desired content is generated. The list generating unit 256 generates the content selection signal based on information related to a content received by the content reception processing unit 255 in response to an operation made by the user who recognizes a content list displayed on the list display unit 257.

The control signal generating unit 252 further generates a playback operation signal used to cause the content display unit 253 of the DMC device 22 to play back a content or stop or pause the playback of the content and an operation signal used to start, stop, or pause a playback of a content in the DMR device 23.

<Configuration of DMR Device>

Figure 6:
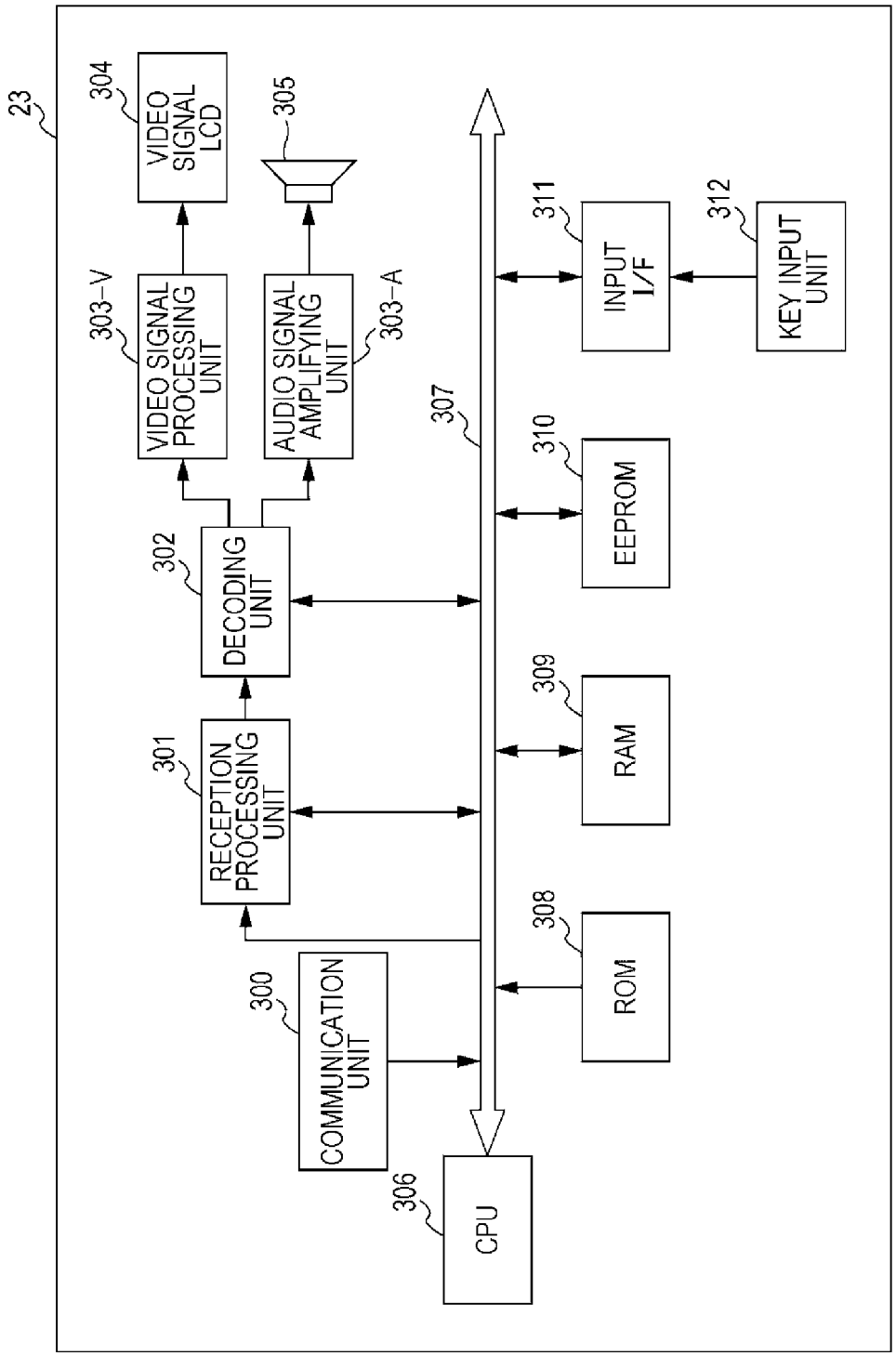
FIG. 6 is a diagram illustrating an exemplary configuration of a DMR device.

FIG. 6 is a diagram illustrating an exemplary hardware configuration of the DMR device 23. For example, the DMR device 23 includes a communication unit 300, a reception processing unit 301, a decoding unit 302, a video signal processing unit 303-V, an LCD 304, an audio signal amplifying unit 303-A, and a speaker 305.

The respective components of the DMR device 23 are configured to be controlled by a control unit including a CPU 306 as a main part. The control unit is a micro computer configured such that the CPU 306, a ROM 308, a RAM 309, and an EEPROM 310 are connected to one another via a CPU bus 307. The CPU 306 is connected with a key input unit 312 through an input I/F 311, and receives an operation signal representing, for example, a volume adjustment, an image quality adjustment, a power supply/disconnection, or the like.

The ROM 308 records, for example, various kinds of processing programs executed in the DMR device 23 or the like or data necessary for processing. The RAM 309 temporarily stores and holds data obtained in various kinds of processing, and mainly used as a work area of various kinds of processing.

The EEPROM 310 is a so-called non-volatile memory, and can store and hold, for example, various kinds of setting parameters without losing stored and held information even when power is removed.

The communication unit 300 performs a communication process via the home network 10. The reception processing unit 301 perform, for example, a process of demodulating a signal supplied through the communication unit 300, and supplies a demodulated signal to the decoding unit (decompression processing unit) 302. The content server 21 performs data compression on a content, and transmits compressed content. Thus, the decoding unit 302 of the DMR device 23 is supplied with the signal which has been subjected to the demodulation and the data compression from the reception processing unit 301, separates a video signal and an audio signal from each other, decompresses the separated signals, and reconstructs an original signal before data compression.

Then, the decoding unit 302 performs digital/analog (D/A) conversion on the reconstructed video signal and audio signal, and generates an analog video signal and an analog audio signal. Then, the decoding unit 302 supplies the analog video signal to the video signal processing unit 303-V, and supplies the analog audio signal to the audio signal amplifying unit 303-A.

The video signal processing unit 303-V generates a display signal based on the video signal supplied from the decoding unit 302, and supplies the video signal to the LCD 304. Through this operation, a video corresponding to the video signal transmitted from the content server 21 is displayed on a display screen of the LCD 304.

Meanwhile, the audio signal amplifying unit 303-A amplifies the supplied audio signal up to a predetermined level, and supplies the amplified audio signal to the speaker 305. Through this operation, a sound corresponding to the audio signal associated with the video signal transmitted from the content server 21 is output from the speaker 305.

As described above, the DMR device 23 can receive a video signal and an audio signal such as a television broadcasting program transmitted from the content server 21 via the network 10, and play back and output the received video signal and the audio signal to be provided to the user.

Figure 7:
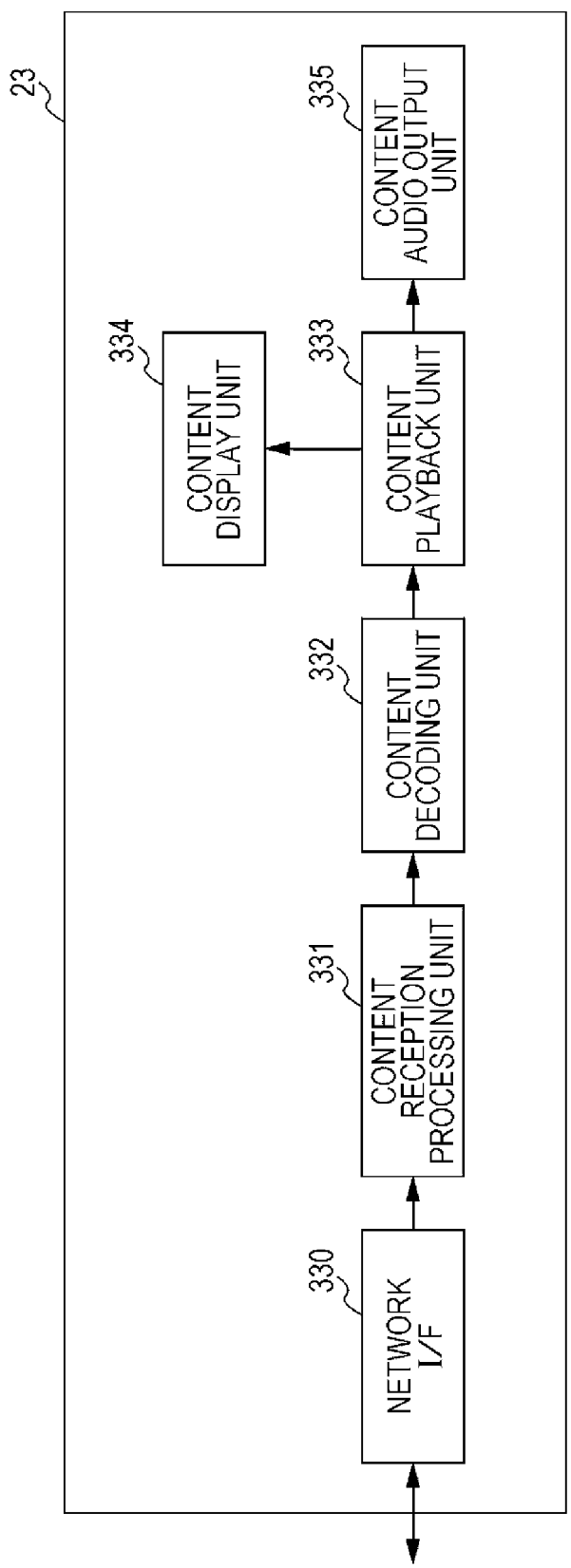
FIG. 7 is a diagram illustrating a function of a DMR device.

FIG. 7 is a functional block diagram of the DMR device 23. For example, the DMR device 23 is a display playback device that has a streaming playback function of receiving streaming data distributed from the content server 21 in the streaming manner and playing back the streaming data, and plays audio data associated with a video and outputs the audio data through a speaker.

The DMR device 23 includes a network I/F 330 which is an interface function unit connected to the network 10 and a content reception processing unit 331 that receives streaming data (content data) through the network I/F 330.

The DMR device 23 further includes a content decoding unit 332 that decodes content data and a content playback unit 333 that plays back the content data decoded by the content decoding unit 332. The DMR device 23 further includes a content display unit 334 that displays a video of the played-back content and a content audio output unit 335 that outputs a sound of the played-back content.

The DMR device 23 operates as a streaming playback function unit using the above function units as follows. A connection to the network 10 is established through the communication unit 300, the reception processing unit 301 receives streaming data (content data) through the communication unit 300, the decoding unit 302 decodes the content data, the video signal processing unit 303-V plays back the content data decoded by the decoding unit 302, the video signal LCD 304 displays the played-back content video, and the speaker 305 outputs a sound associated with the video.

<First Process Related to Playback Transition>

Next, a process executed in the system illustrated in FIG. 1 will be described. The following description will proceed with a process when in the state in which the DMC device 22 is playing back the content A managed by the content server 21, a playback start request is output, and the DMR device 23 takes over the playback from a playback position A of the content A being played back at that point in time.

In other words, a process when the playback device of the content A changes from the DMC device 22 to the DMR device 23 will be described. Further, the following description will proceed focusing on processes of the DMC device 22 and the DMR device 23, and a process of the content server 21 that distributes a content will not be described.

Here, the description will continue in connection with the example in which the content server 21 distributes the content A, but the DMC device 22 may be configured to have a function of storing the content A and distributing the content A. For example, the process which will be described below can be applied even when the content A managed by the DMC device 22 is played back by the DMC device 22, and the content A is consecutively played back by the DMR device 23.

In other words, here, a process performed among three devices, that is, the content server 21, the DMC device 22, and the DMR device 23 will be described as an example, and an application of the present embodiment is not limited to the process among the three devices. The present technology may be a process performed between two devices, that is, the DMC device 22 and the DMR device 23, and the process which will be described below can be applied even to the process performed between two devices.

Here, for example, the description will proceed in connection with an example in which the content server 21, the DMC device 22, and the DMR device 23 are connected to a home network (local network) such as a DLNA, but the range of applications of the present technology is not intended to be limited to a home network.

For example, the present technology can be applied even when all or a part of the network 10 is configured with a wide area network such as the Internet. For example, the process which will be described can be applied even to the form in which the content server 21 is connected to a network such as the Internet, and the DMC device 22 and the DMR device 23 are connected to a home network.

A first process related to playback transition will be described with reference to a flowchart of FIG. 8. In step S101, when the content A managed by the content server 21 is being played, the DMC device 22 receives a playback start request instruction from the user through the input operation receiving unit 250, and determines that it is the playback start request instruction through the input operation determining unit 251. The user performs a predetermined operation while viewing the content A through the DMC device 22 and makes a playback start request for causing the DMR device 23 to start the playback of the content A. Here, a request (instruction) generated in order to have another device to take over the playback of content is referred to as a "playback start request."

In steps S102 to S104, the control signal generating unit 252 of the DMC device 22 generates a signal related to the playback start request, and transmits the signal from to the DMR device 23 through the network I/F 254 via the network 10.

First, in step S102, the DMC device 22 informs the DMR device 23 of a content URI of a content on which a playback instruction is given, in this case, a content URI of the content A. In step S103, the DMC device 22 instructs the DMR device 23 to perform a seek operation. At this time, an instructed seek location is a playback position (the playback position A) at which the playback is being performed when the playback start request is made. Then, in step S104, the DMC device 22 instructs the DMR device 23 to start the playback.

The content reception processing unit 331 of the DMR device 23 receives the content URI of the content A from the DMC device 22 through the network I/F 330 in step S121, receives the seek position, that is, the playback position A in step S122, and receives the playback start instruction in step S123.

Upon receiving the playback start instruction, in step S124, the DMR device 23 begins preparation for starting the playback from the playback position A of the content A. Then, when the playback preparation is completed, in step S125, the playback starts from the playback position A.

The DMR device 23 accesses the content server 21 based on the content URI, and performs a process of seeking the playback position A and decoding content data from the content server 21 through the content decoding unit 332. In order to perform this process, it takes some time until the playback actually starts in the DMR device 23 from the playback position A.

Further, since content data is transmitted via the network 10, there are cases in which it is difficult to start the playback immediately due to a network delay. Further, it may take some time to perform the above process depending on the processing capability of the DMR device 23.

Thus, it may take, for example, several seconds until the playback actually starts from the playback position A in step S125 after the preparation of the playback from the playback position A starts in step S124.

Until the playback starts in the DMR device 23 and a video or a sound is provided to the user after a point in time at which the playback start instruction is given from the DMC device 22 to the DMR device 23, the playback is not immediately performed in the DMR device 23 due to the above-mentioned reason. If the playback in the DMC device 22 stops at the playback position A, there occurs a period of time in which a content is provided to the user by neither the DMC device 22 nor the DMR device 23 until the playback starts in the DMR device 23 from the playback position A.

When a period of time in which a content is provided to the user by neither the DMC device 22 nor the DMR device 23 occurs, the user is likely to have an uneasy feeling that the playback start request may not be accepted or impatience on a situation in which a video is not provided. This situation results in degradation in usability or degradation in reliability of a device and thus has to be prevented.

In this regard, even after the DMC device 22 gives the playback start instruction to the DMR device 23 in step S104, in step S105, the DMC device 22 continuously performs the playback of the content A. Since the DMC device 22 continuously performs the playback of the content A as described above, the content can be provided through the DMC device 22 until the playback preparation is completed in the DMR device 23.

Thus, a period of time in which a content is not provided to the user can be removed.

While the DMC device 22 continuously performs the playback of content, the DMR device 23 performs preparation for starting the playback of the content A from the playback position A. Then, in step S125, when the playback of the content A starts at the DMR device 23 side from the playback position A, the DMC device 22 detects that the playback has started in the DMR device 23.

The DMR device 23 performs polling on the status of the DMR device 23. When it is detected that the DMR device 23 has started the playback as a result of polling, in step S107, the DMC device 22 calculates a processing time. The time calculated in step S107 is a time until the playback starts in the DMR device 23 after the playback of the content A is instructed.

For example, the time is calculated by the following equation.

$$\text{Playback position } B = \text{current playback position} - \text{playback position } A$$

The "current playback position" refers to a position at which the playback is being performed when the process of step S107 is executed. The "playback position A" is a playback position when the seek instruction is given in step S103, that is, a position at which the playback is being performed when the playback start request is made.

A period of time taken until the playback of content starts in the DMR device 23 can be calculated by subtracting the "playback position A" from the "current playback position." The "playback position B" calculated as described above corresponds to a period of time at which the playback is being maintained at the DMC device 22 while the DMR device 23 is preparing for the playback preparation.

Further, when a period of time related to preparation of the playback at the DMR device 23 side is calculated by the DMC device 22, the DMC device 22 side may calculate a period of time by performing measurement of time until the playback start is detected as the process of step S104 after the playback instruction is given as the process of step S104. Further, measurement of time may be performed by counting the number of times of polling. A method which is not described here may be used as a method of calculating a period of time.

In step S108, a seek instruction is given from the DMC device 22 to the DMR device 23 again. In step S108, the seek position given from the DMC device 22 to the DMR device 23 is the playback position B. In step S127, the DMR device 23 that has received the seek instruction in step S126 seeks the playback position B, and starts the playback from the playback position B.

Since the DMR device 23 has been already supplied with the content A from the content server 21 and has completed the playback preparation, as the seek position is instructed, it is possible to perform the seek operation and then start the playback.

As described above, when the playback starts from the playback position A, the DMR device 23 side is given an instruction to perform the playback from the playback position B and starts the playback from the playback position B. If the playback instruction from the playback position B is not given, the following operation is performed.

The DMC device 22 performs the playback from the playback position A to the playback position B. The DMR device 23 starts the playback from the playback position A at a point in time at which the DMC device 22 plays back the playback position B. The user watches the content from the playback position A to the playback position B through the DMC device 22 and then watches the content from the playback position A to the playback position B through the DMR device 23 again.

In order to prevent the content from the playback position A to the playback position B from being provided to the user twice as described above, as described above, when the DMR device 23 side starts the playback from the playback position A, it is necessary to instruct the playback from the playback position B and start the playback from the playback position B.

In this case, the user can be provided with the content from the playback position A to the playback position B through the DMC device 22 and can be consecutively provided with the content subsequent to the playback position B through the DMR device 23.

When the playback starts in the DMR device 23 from the playback position B as described above, in step S109, the DMC device 22 stops the playback of the content A. The user can watch the content A which has been watched through the DMC device 22 consecutively through the DMR device 23.

As described above, according to the present technology, when a device that plays back a content is switched, it is possible to remove a period of time in which a content such as a video or a sound is not provided to the user. Further, when a device that plays back a content is switched, it is possible to prevent the same part from being played back and to provide a content consecutively.

Figure 9:
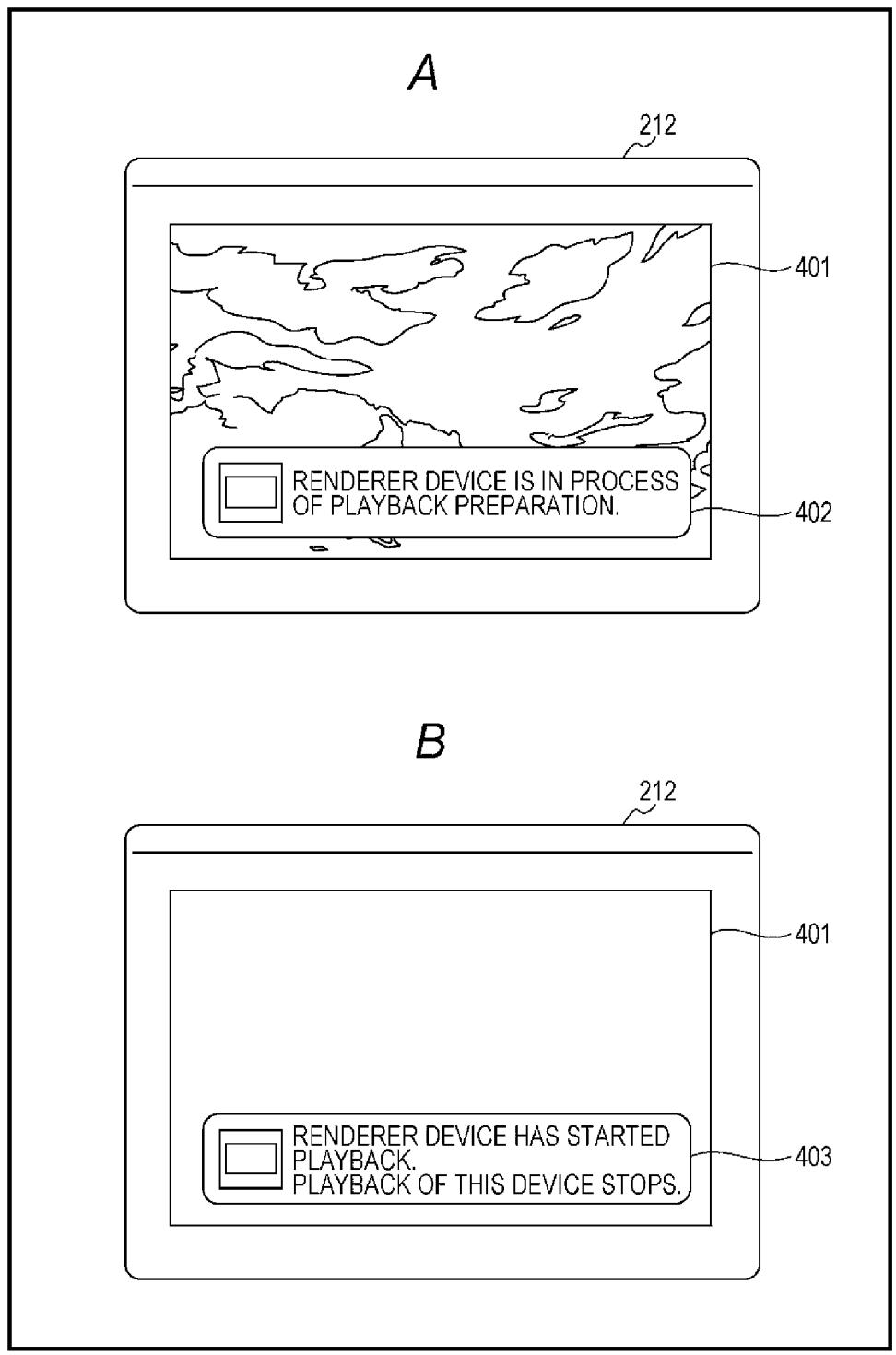
FIG. 9 is an exemplary screen displayed on a DMC device.

Here, FIG. 9A illustrates an exemplary display when the playback is consecutively performed by the DMC device 22 (when the process of step S105 is being performed). FIG. 9A is an exemplary screen displayed on the display 212 of the DMC device 22, that is, an exemplary screen when the playback of the content A is continuously performed. A video 401 of the content A being continuously played back and a message display section 402 are displayed on the display 212.

A message representing "Renderer device is in process of playback preparation." is displayed on the message display section 402. The "renderer device" refers to the DMR device 23. As the message is displayed, the user can recognize that the playback of the content A is continuously being performed since the playback start request has been received from the user but the playback preparation is not completed in the DMR device 23. A message to be displayed on the message display section 402 is not limited to this example as long as the message helps the user recognize it.

In the state in which the message is displayed and the playback of the content A is continuously being performed, when the DMR device 23 starts the playback of the content A, the screen of the display 212 of the DMC device 22 is switched to a screen illustrated in FIG. 9B. The screen illustrated in FIG. 9B is a screen displayed when the playback stops in step S109.

Referring to FIG. 9B, since the playback of the video 401 of the content A has stopped, a black screen is displayed. A message display section 403 is displayed on the black screen. A message representing "Renderer device has started playback. Playback of this device stops." is displayed on the message display section 403.

As the message is displayed, the user can recognize that the DMR device 23 has completed the playback preparation and has started the playback, and the user can also recognize that the DMC device 22 has stopped the playback. The user who has seen the message can smoothly switch watching from watching of the content A by the DMC device 22 to watching of the content A by the DMR device 23.

As the message is displayed on the display 212 of the DMC device 22, the user can recognize a video switching timing and can be encourage to smoothly switch watching.

<Second Process Related to Playback Transition>

The first process related to playback transition has been described in connection with the example in which the playback of the content A is continuously performed in the DMC device 22 until preparation for the playback of the content A is completed in the DMR device 23, and when preparation for the playback of the content A is completed in the DMR device 23, the DMC device 22 stops the playback of the content A. In this case, if the user does not switch watching to the playback by DMR device 23 immediately after the playback stops in the DMC device 22, the user is likely to miss a beginning section played back in the DMR device 23.

In this regard, even after the playback of the content A starts in the DMC device 22, the DMR device 23 continuously performs the playback by a predetermined period of time, and thus the user is given a time necessary to switch watching. As described above, a process when the user is given a time necessary to switch watching will be described with reference to a flowchart of FIG. 10.

Figure 10:
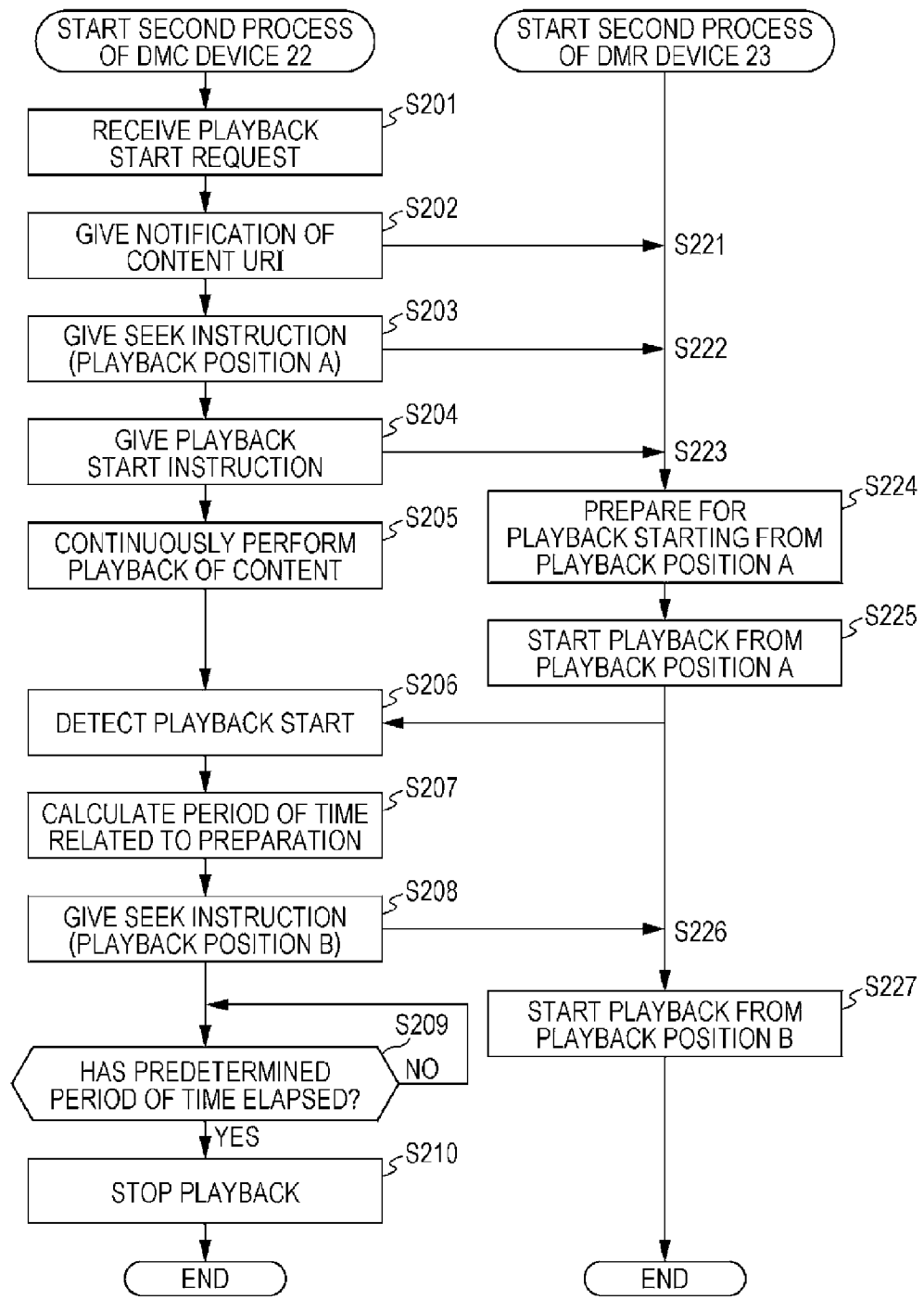
FIG. 10 is a flowchart for describing a second process related to playback transition.

In the process of the flowchart illustrated in FIG. 10, the process of continuously performing the playback of content in the DMC device 22 until the DMR device 23 completes the playback preparation and then starts the playback from the playback position B is the same as the process described above with reference to FIG. 8. In other words, in the process of the flowchart illustrated in FIG. 10, the process of steps S201 to S208 is the same as the process of steps S101 to S108 illustrated in FIG. 8, and thus a description thereof will not be made.

Figure 8:
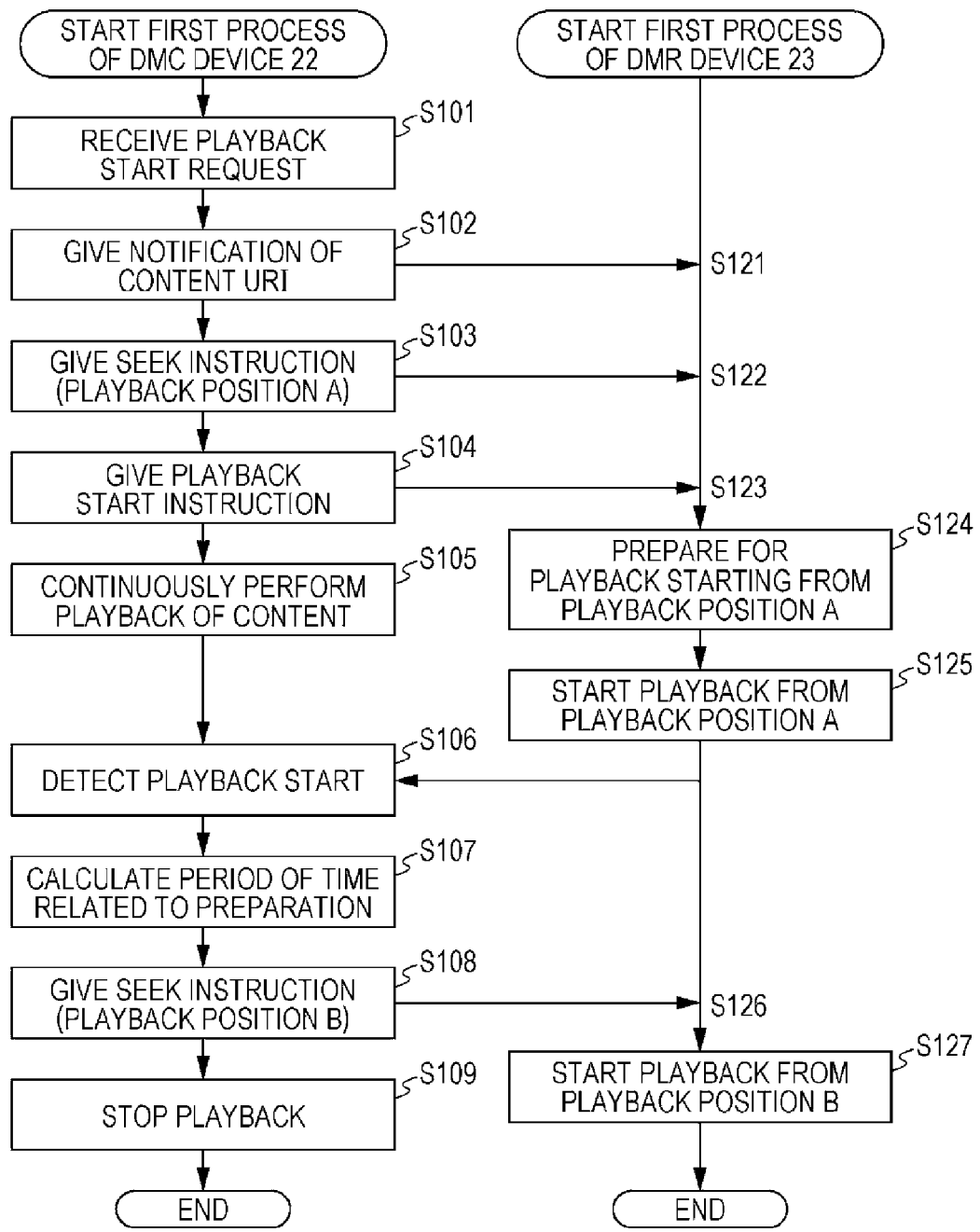
FIG. 8 is a flowchart for describing a first process related to playback transition.

Further, the process of steps S221 to S227 in which the DMR device 23 receives an instruction from the DMC device 22 and starts the playback of the content A is the same as the process of steps S121 to S127 illustrated in FIG. 8, and thus a description thereof will not be made.

When the DMC device 22 gives an instruction to seek the playback position B to the DMR device 23 while continuously performing the playback of the content A, in step S209, it is determined whether or not a predetermined period of time has elapsed. The predetermined period of time is a period of time necessary for the user to switch watching by the DMC device 22 to watching by the DMR device 23, for example, about 3 seconds.

The process of step S209 is performed until it is determined in step S209 that the predetermined period of time has elapsed, and when it is determined that the predetermined period of time has elapsed, the process proceeds to step S210. In step S210, the DMC device 22 stops the playback of the content A.

In step S209, when the user is given a period of time to switch a watching target as described above, the message display section 403 illustrated in FIG. 9B may be displayed on the display 212 of the DMC device 22 so that the message is provided to the user.

A period of time to display the message may be set to the predetermined period of time in step S209. The user can switch the watching target while the message is being displayed during the predetermined period of time.

Figure 11:
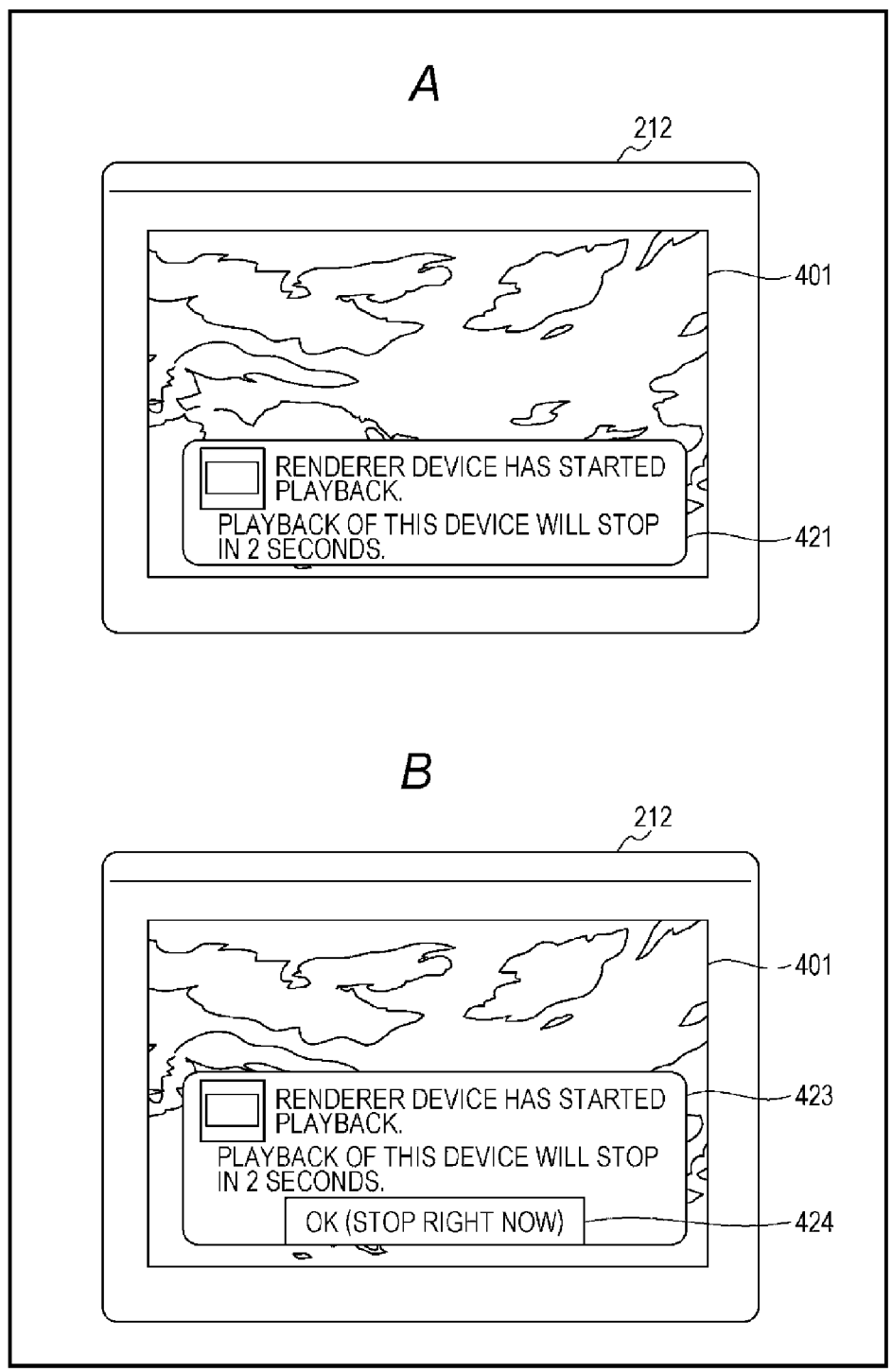
FIG. 11 is an exemplary screen displayed on a DMC device.

Alternatively, as illustrated in FIG. 11A, a period of time until the playback stops may be specifically provided. Referring to FIG. 11A, a message representing "Renderer device has started playback. Playback of this device will stop in 2 seconds." is displayed on a message display section 421. The user can be provided with time information until the playback stops through "in 2 seconds" in this message.

In the example illustrated in FIG. 11A, "in 2 seconds" is displayed, but a number in "2 seconds" may be regarded as a countdown display according to a remaining time such as 3 seconds, 2 seconds, and 1 second.

Here, the playback is described to stop after a predetermined period of time elapses, but in addition to or instead of the process of stopping the playback after a predetermined period of time elapses, the playback may be stopped in response to the user's instruction.

When the playback is stopped in response to the user's instruction in addition to the process of stopping the playback after a predetermined period of time elapses, for example, a message illustrated in FIG. 11B is displayed. Referring to FIG. 11B, a message representing "Renderer device has started playback. Playback of this device will stop in 2 seconds." is displayed on a message display section 423. In addition, a button 424 representing "OK (stop right now)" is displayed on a part of the message display section 423.

When the button 424 is operated, the playback stops at an operation point in time. Further, even when the button 424 is not operated, the playback stops when a predetermined period of time (for example, 2 seconds) elapses. Further, when the playback is stopped in response to the user's instruction in addition to the process of stopping the playback after a predetermined period of time elapses as described above, a determination process such as "Has button 424 been operated?" may be added, for example, before or after the process of step S209 although not illustrated.

Further, only the button 424 may be displayed. In other words, the playback may stop at a point in time at which the user's instruction is given.

As described above, a period of time in which the content A is continuously played back by the DMC device 22 may be extended by a period of time necessary for the user to switch watching.

<Third Process Related to Playback Transition>

In the "first process related to playback transition" or the "second process related to playback transition," the DMR device 23 side starts the playback from the playback position B immediately after the playback from the playback position A starts. For example, referring back to the flowchart of FIG. 10, in step S225, the playback from the playback position A starts, but then, in step S227, the playback from the playback position B starts.

In this case, after a sound and a video at the playback position A are instantly provided to the user, switching to a sound and a video at the playback position B may be performed. As the sound and the video at the playback position A are instantly provided, the user may have an uncomfortable feeling, and thus it is desirable not to provide a sound and a video in the above-mentioned manner as possible as it can. In this regard, as a "third process related to playback transition," a process including a process of causing the sound and the video at the playback position A not to be provided will be described with reference to a flowchart of FIG. 12.

Figure 12:
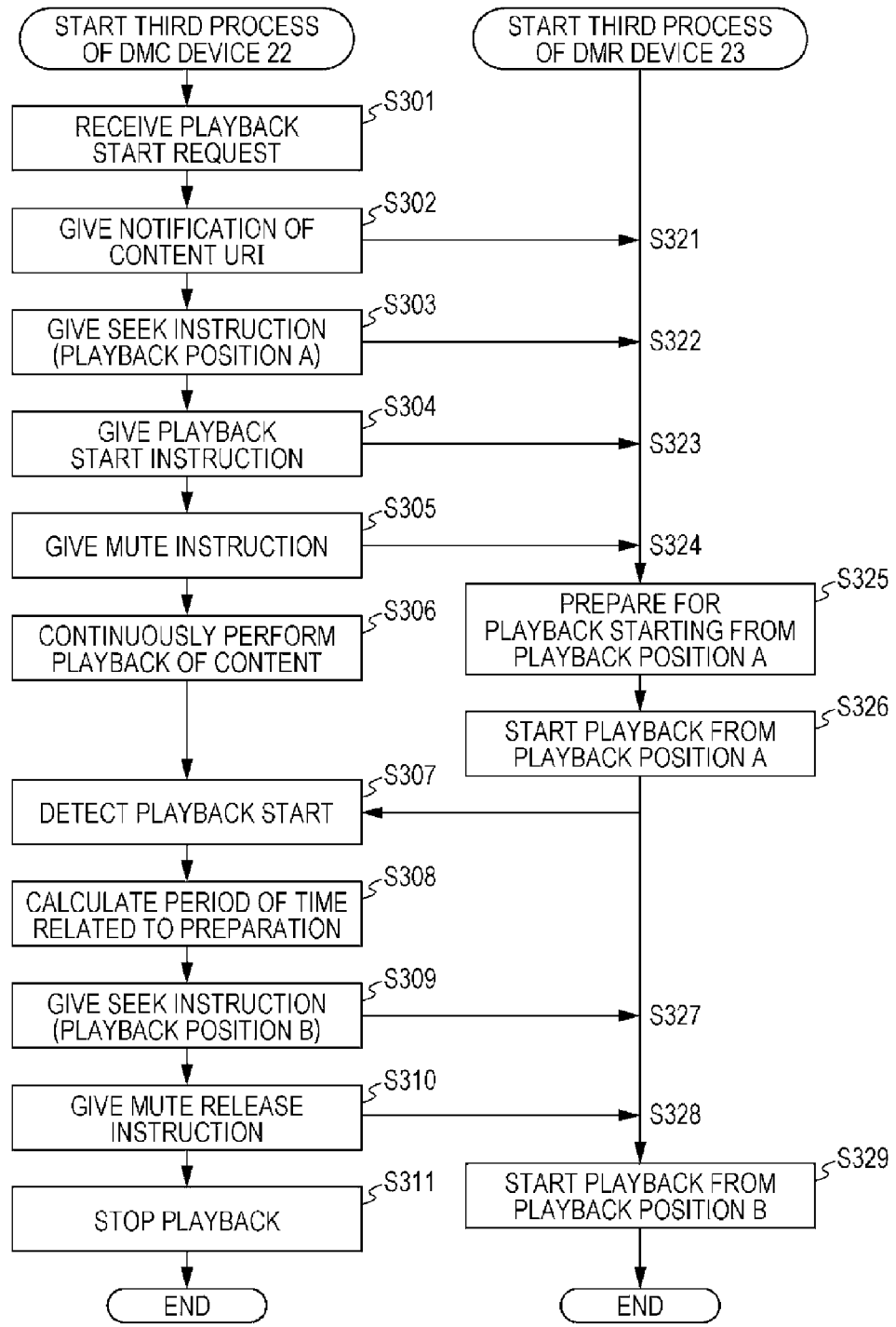
FIG. 12 is a flowchart for describing a third process related to playback transition.

The flowchart illustrated in FIG. 12 is different from the process of the flowchart illustrated in FIG. 8 in that a process of preventing the sound and the video at the playback position A from being instantly provided, and the remaining process is similar. A redundant description will not be repeated, and the description will proceed with an added process.

When the DMC device 22 receives the playback start request in step S301, in steps S302 to S304, notification of a content URI, an instruction to seek the playback position A, and a playback start instruction are given to the DMR device 23.

In step S305, the DMC device 22 gives a mute instruction to the DMR device 23. The mute instruction is an instruction to mute either or both of a video and a sound. Since a function of muting a sound is usually included in a terminal such as a television receiver, a sound can be muted by an instruction given from the DMC device 22 side to the DMR device 23 side.

However, a terminal such as a television receiver usually does not have a function of muting a video. Video muting will be described later with reference to FIG. 13. Further, when a terminal such as a television receiver has a function of muting a video, a video can be muted using the function of the terminal rather than a method which will be described later with reference to FIG. 13.

Further, a term "mute" generally means sound deadening and is used as a meaning that a sound is not output, but in the present embodiment, "mute" is described to also include a meaning that a video is not displayed.

Referring back to the description of the flowchart, when the mute instruction is given from the DMC device 22 to the DMR device 23 in step S305, the process proceeds to step S306, and the DMC device 22 side continuously performs the playback of the content.

Meanwhile, when the DMR device 23 side is given the notification of the content URI, the instruction to seek the playback position A, the playback start instruction, and the mute instruction in steps S321 to S324, in step S325, preparation for the playback from the playback position A is performed. Then, when the preparation for the playback is completed, in step S326, the playback starts from the playback position A.

In step S326, the playback starts from the playback position A, but since the mute instruction has been received, the playback is performed in the state in which either or both of a sound and a video are muted. Thus, at least one of the audio and the video is not provided to the user when the playback is performed from the playback position A.

At the DMC device 22 side, when the DMR device 23 side starts the playback, the playback start is detected in step S307, and a period of time taken until the playback is calculated in step S308. In step S309, an instruction to seek the playback position B which the period of time taken until the playback is considered is given to the DMR device 23.

In step S310, the DMC device 22 gives a mute release instruction to the DMR device 23. In step S329, the DMR device 23 that has received the instructions in step S327 and step S328 starts the playback from the playback position B. At the time of the playback, since the mute release instruction has been received, the DMR device 23 starts the playback from the playback position B in the mute release status.

Through this operation, when the playback is performed from the playback position A, it is possible to cause the playback to start from the playback position B without providing the user with the video or the sound.

In step S311, the DMC device 22 stops the playback of the content A which has been continuously played back. When the playback stops, the determination process (the same process as step S209) on whether or not a predetermined period of time has elapsed may be performed as described above with reference to FIG. 10.

Figure 13:
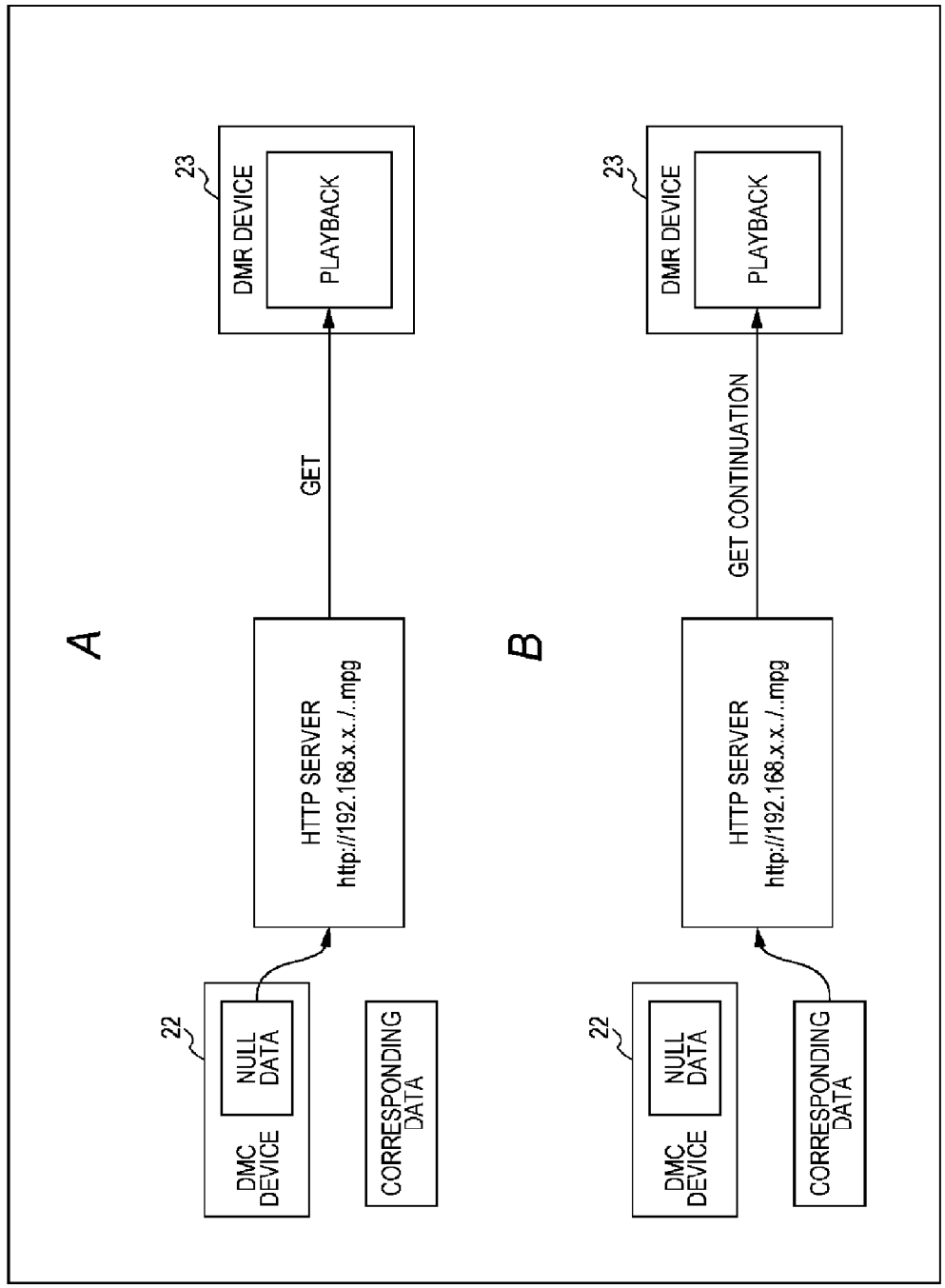
FIG. 13 is a diagram for describing video muting.

The video mute process will be described with reference to FIG. 13. As illustrated in FIG. 13A, the DMC device 22 transmits null data to a HTTP server, and the DMR device 23 acquires and plays back the null data. Due to the null data, a black screen is displayed on the DMR device 23. As the black screen is provided to the user, the video can be prevented from being provided from the playback position A. A sound can be muted such that null data is included as a sound and played back.

In the flowchart of FIG. 12, in step S305, the DMC device 22 gives the mute instruction to the DMR device 23, but instead of the process of giving the mute instruction, a process of transmitting null data to the HTTP server may be performed. The HTTP server may be used as the content server 21.

Through this operation, the DMR device 23 side performs preparation for the playback of the content A from the content server 21, but actually, the DMR device 23 side performs preparation for processing null data from the DMC device 22 and then plays back the null data.

In other words, the DMR device 23 performs preparation for the playback of the content A from the playback position A in step S325 (FIG. 12), and starts the playback from the playback position A in step S326, but the DMR device 23 acquires null data from the DMC device 22 as the content starting from the playback position A, and starts to play back the null data. Since the null data is played back, the DMC device 22 provides a state in which a black screen is displayed but a sound is not output. Through this operation, a video and a sound can be muted.

Then, when the playback starts from the playback position B, supply of null data is stopped, and a supply of corresponding data (content data of the content A) starts. For example, in the flowchart of FIG. 12, in step S310, the DMC device 22 gives the mute release instruction to the DMR device 23, but instead of the process of giving the mute release instruction, a process of stopping transmission of null data to the HTTP server may be performed.

The DMR device 23 acquires the content A from the already accessed content server 21 (the HTTP server) and plays back the content. In other words, in step S329 (FIG. 12), the DMR device 23 starts the playback from the playback position B of the content A.

Through this process, the DMR device 23 enters the state in which a video and a sound are muted while preparation for the playback of the content A is being performed, and after the playback preparation is completed, the playback can start from the playback position B. Thus, it is possible to prevent a video and a sound starting from the playback position A from being instantly provided to the user.

<Fourth Process Related to Playback Transition>

In the "first process related to playback transition," the "second process related to playback transition," and the "third process related to playback transition," the DMC device 22 calculates a period of time taken for the playback preparation at the DMR device 23 side and gives the seek instruction again, and the DMR device 23 starts the playback of a content.

For example, referring back to the flowchart of FIG. 12, the DMC device 22 calculates a period of time related to the process of preparing for the playback in the DMR device 23 in step S308, and gives an instruction to seek the playback position B in step S309. As described above, when the playback start request is made, a period of time related to the process of preparing for the playback is calculated based on information obtained from the DMR device 23 at that point in time.

The period of time related to the process of preparing for the playback depends on a communication status of the network 10, the processing capability of the DMR device 23, or the like. In the case in which the communication status, the processing capability, or the like does not significantly change each time the playback start request is made, when the playback start request is made, the preparation for the playback of a content may be actually performed, and a period of time related to the process may not be acquired, and a period of time related to the process of preparing for the playback may be acquired at a point in time different a point in time at which the playback start request is output (at a point in time different from that in the above-described embodiment).

Figure 14:
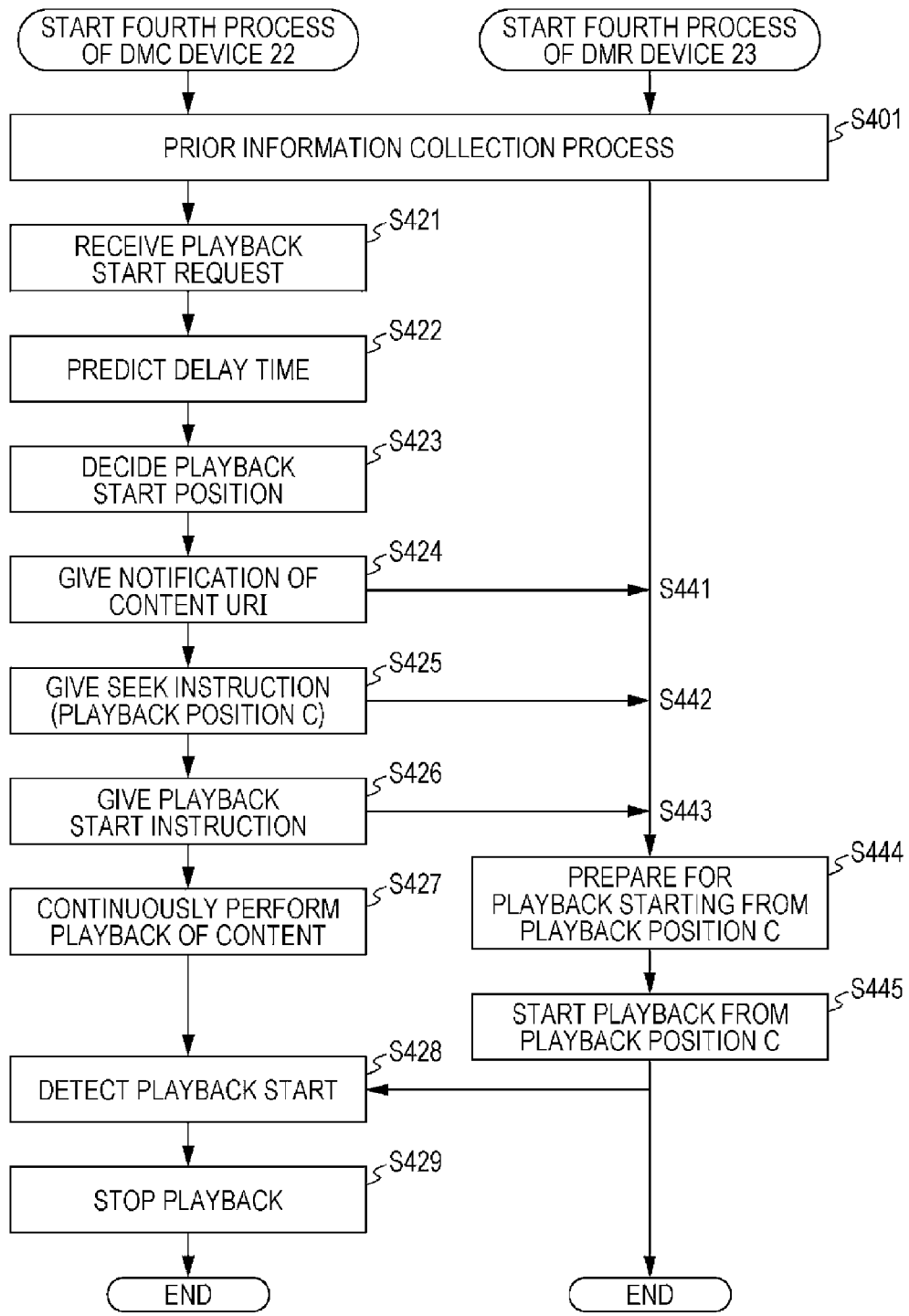
FIG. 14 is a flowchart for describing a fourth process related to playback transition.

As a "fourth process related to playback transition," a process of calculating a period of time related to the process of preparing for the playback in advance will be described with reference to a flowchart of FIG. 14. In step S401, a prior information collection process is performed between the DMC device 22 and the DMR device 23. In other words, in step S401, the DMR device 23 performs a process of calculating a predetermined period of time related to preparation for the playback of a content.

The DMC device 22 performs the prior information collection process before or after the playback start request instruction is received from the user. First, an example in which the prior information collection process is performed before the playback start request is received as illustrated in FIG. 14 will be described. In this case, as the prior information collection process, information is collected by a method similar to a ping, that is, a method of sending a packet to the network 10 and measuring a network environment.

Further, as a target device from which information is collected, all devices searched when a DLNA device search process is performed may be included. Further, a device in which a content can be played back may be included as a target.

As another prior information collection process, there is a method performed based on learning. For example, each time the playback transition process is performed through the "first to third processes related to playback transition," the DMR device 23 measures a period of time related to the playback preparation and accumulates the measured time information. An average value is calculated each time information is accumulated, and learning is performed.

The learning may be performed at the DMC device 22 side and used when a delay time is predicted in step S422 which will be described later. In the present embodiment, the "delay time" refers to a period of time related to the playback preparation in the DMR device 23.

The learning may be performed at the DMR device 23 side, supplied to the DMC device 22 according to a request from the DMC device 22 side, and used when the delay time is predicted at the DMC device 22 side.

Figure 15:
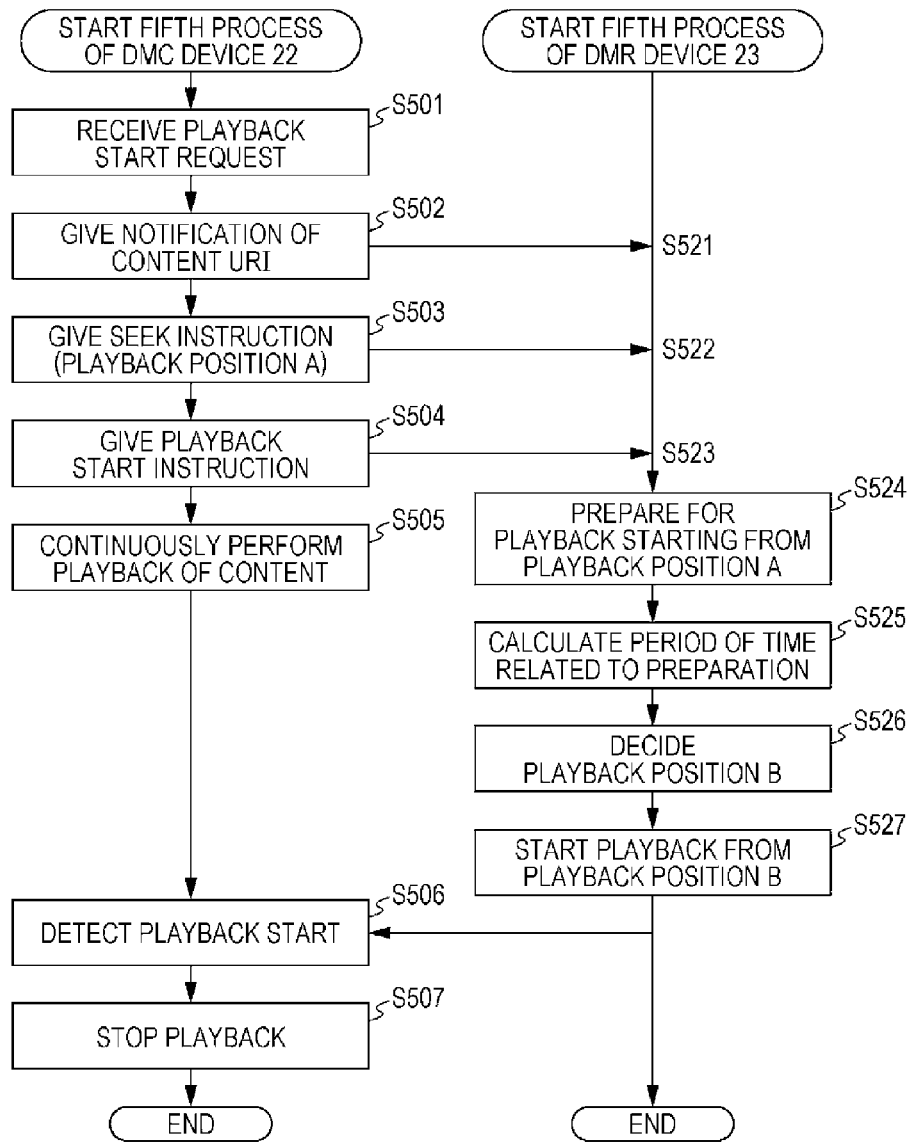
FIG. 15 is a flowchart for describing a fifth process related to playback transition.

Alternatively, the learning may be performed at the DMR device 23 side and used when the delay time is predicted at the DMR device 23 side. A process related to an example in which the delay time is predicted at the DMR device 23 side will be described later with reference to a flowchart of FIG. 15.

Further, the DMR device 23 holds information related to a processing time according to the size or the type of a content, and the information may be provided to the DMC device 22 side and used when the delay time is predicted at the DMC device 22 side. Further, the delay time may be predicted at the DMR device 23 side based on the information.

The DMR device 23 may hold information related to a processing time according to the size or the type of a content and perform the above-described learning. In addition, held information may be updated based on information obtained by learning.

Through this operation, in step S401, the prior information collection process is performed, and information related to a delay is acquired. Here, the description will continue in connection with an example in which the DMC device 22 acquires information and predicts a delay time.

In step S421, the DMC device 22 receives the playback start request instruction. As described above, the prior information collection process executed in step S401 may be performed after the playback start request is received. When the prior information collection process is performed after the playback start request is received, the process may be performed on a terminal that receives an instruction to play back a content. In other words, here, since the prior information collection process can be performed on the DMR device 23 and it is unnecessary to perform the process on another device, the number of processes related to the prior information collection process can be reduced.

Data of a content scheduled to be played back is transmitted to the DMR device 23 selected as a terminal performing a playback by the user, and information such as a delay status of a network or the processing capability of the DMR device 23 is collected.

Further, transmission of a packet to the network 10 and measurement of the environment of the network 10 by the method similar to the ping may be performed after the playback start request is received. Further, information obtained by the learning may be acquired from a terminal performing a playback after the playback start request is received.

When the playback start request is received and information used to predict the delay time is acquired, in step S422, the DMC device 22 predicts the delay time based on the acquired information. A method of predicting the delay time depends on information to be acquired. For example, information obtained by measuring a network environment is used to predict the delay time. For example, when the delay time has been already predicted by learning, the prediction is performed such as the delay time is called.

When the delay time is predicted in step S422, in step S423, a playback start position is decided. A position obtained by adding the predicted delay time calculated from the position of the content A being played back by the DMC device 22 at a point in time at which the process of step S423 is executed is decided as the playback start position. The playback start position decided in step S423 is referred to as a "playback position C."

In step S424, the DMC device 22 notifies the DMR device 23 of the content URI of the content A. In step S425, an instruction to seek the playback position C is given from the DMC device 22 to the DMR device 23. Then, in step S426, a playback start instruction is given from the DMC device 22 to the DMR device 23.

Even after the instructions are given, in step S427, the DMC device 22 continuously performs the playback of the content. When the instructions are output from the DMC device 22, the DMR device 23 receives the content URI in step S441, receives the instruction to seek the playback position C in step S442, and receives the playback start instruction in step S443.

Then, in step S444, the DMR device 23 performs preparation for the playback from the playback position C. Then, when the preparation for the playback from the playback position C is completed, in step S445, the playback starts from the playback position C.

When the DMR device 23 starts the playback from the playback position C, in step S428, the DMC device 22 detects that the playback has started. In step S429, the DMC device 22 stops the playback of the content A. In this case, similarly to the "second process related to playback transition," the playback may stop after a predetermined period of time elapses.

In the "fourth process related to playback transition," the DMC device 22 performs the playback of the content A from the playback position A to the playback position C. Then, the DMR device 23 starts the playback from the playback position C of the content A. Thus, in this case, the playback transition from the DMC device 22 to the DMR device 23 is smoothly performed.

Further, in the "fourth process related to playback transition," since the DMC device 22 side predicts the delay time and instructs the DMR device 23 of the playback position to seek, the number of times that the seek instruction is given can be reduced to once. Further, since instruction of the seek position (the playback start position) is given based on the predicted delay time, the problem, in that "a video and a sound starting from the playback position A are instantly provided to the user," described in the "third process related to playback transition" does not occur, and thus it is unnecessary to perform the process of muting a video and a sound.

Further, in the above embodiment, the prior information collection process is performed, and information obtained as a result of performing the prior information collection process is used for prediction of the delay time. In this case, the delay time is regarded as a variable value depending on the acquired information but may be dealt as a fixed value. For example, a predetermined period of time may be set as the delay time, and the prior information collection process may not be performed.

When the delay time is set to a fixed value which is relatively short, a time taken for playback preparation at the DMR device 23 side is longer than the delay time, and thus a section continuously played back by the DMC device 22 is likely to overlap a beginning section played back by the DMR device 23.

Further, when the delay time is set to a relatively long time, a time taken for playback preparation at the DMR device 23 side is shorter than the delay time, and thus there occurs a gap between a playback position at which the playback stops after the playback is continuously performed by the DMC device 22 and a playback position at which the playback starts by the DMR device 23, and there is likely to be a section which is not provided to the user.

In this regard, even when the delay time is set to a fixed value, the learning method may be applied, and the fixed value may be appropriately updated. Further, when the delay time is set to a fixed value, a plurality of fixed values may be prepared, and a fixed value may be selectively used depending on a device that performs a playback, a network environment, or the like.

<Fifth Process Related to Playback Transition>

The "first to fourth processes related to playback transition" have been described in connection with the example in which the DMC device 22 calculates a period of time taken for the playback preparation at the DMR device 23 side. Next, as a "fifth process related to playback transition," an example in which the DMR device 23 side calculates a period of time related to the playback preparation and changes the playback position will be described with reference to a flowchart of FIG. 15.

The process of steps S501 to S506 executed in the DMC device 22 is performed in a manner similar to the process of steps S101 to S106 in the process of the flowchart illustrated in FIG. 8. In other words, when the playback start request is received, the DMC device 22 gives notification of the content URI, an instruction to seek the playback position A, and the playback start instruction to the DMR device 23.

Then, the DMR device 23 continuously performs the playback of the content until the DMR device 23 detects that the playback has started. Since the DMC device 22 side need not calculate a period of time related to the preparation for the playback by the DMR device 23, when it is detected that the playback has started at the DMR device 23 side, in step S507, the DMC device 22 stops the playback.

Meanwhile, when the notification of the content URI, the instruction to seek the playback position A, and the playback start instruction are received in steps S521 to S523, in step S524, the DMR device 23 prepares for the playback from the playback position A. Then, in step S525, when the playback preparation is completed, a period of time related to the playback preparation is calculated.

For example, the DMR device 23 measures a time until the playback preparation is completed after the playback start instruction is received from the DMC device 22, and regards the measured time as a period of time related to the playback preparation. Alternatively, as described above in the "fourth process related to playback transition," the DMR device 23 side may be configured to hold information related to the processing time according to the size or the type of a content and calculate a period of time related to the preparation based on the held information.

Alternatively, a period of time related to the preparation may be accumulated as information each time the playback preparation is actually performed, and a period of time related to the preparation may be predicted based on the accumulated information.

In step S525, the DMR device 23 decides the playback position B at which the playback actually starts. A position which is ahead of the playback position A instructed from the DMC device 22 by the period of time calculated in step S525 is regarded as the playback position B. When the playback position B is decided, in step S527, the DMR device 23 starts the playback from the playback position B.

As described above, the DMR device 23 side may be configured to calculate a period of time necessary for preparation for starting of the playback and start the playback from a position ahead by the calculated period of time. In this case, the DMC device 22 may be configured to give a seek instruction only once without needing to give a seek instruction twice.

Further, the DMR device 23 side prepares for the playback from the playback position A and does not perform the playback from the playback position A. Thus, when the playback position is changed from the playback position A to the playback position B, a video and a sound can be prevented from being instantly provided to the user from the playback position A. Thus, the process of muting a video and a sound which is described in the "third process related to playback transition" may not be performed.

As described above, according to the above embodiment, when a content being played back by a terminal A (the DMC device 22) is played back by a succeeding terminal B (the DMR device 23), the content being played back can be played back without interruption nor being displayed to overlap. Further, in the terminal B to which the playback transitions, an unnecessary video or sound can be prevented from being provided to the user.

Further, according to the present embodiment, when the playback of a content switches from the terminal A to the terminal B, the user can be given a time necessary to switch watching.

<Selection of Playback Method>

As described above, a playback in which a content is played back without interruption is here referred to as a "synchronous playback." In contrast with the synchronous playback, a playback to which the present technology is not applied is here referred to as a "normal playback."

The normal playback refers to a playback in which a content being played back by the DMC device 22 is played back by the succeeding DMR device 23, the playback starts from the playback position A at a point in time when the playback preparation is completed based on an instruction from the DMC device 22 without considering a period of time taken for the playback preparation at the DMR device 23.

Further, the normal playback refers to a playback in which the playback at the DMC device 22 stops at a point in time at which the playback start request is received. Thus, in the case of the normal playback, the content is not provided to the user until the playback starts in the DMR device 23 after the DMC device 22 stops the playback.

A mechanism in which the user can select the synchronous playback and the normal playback may be provided. Further, switching between the synchronous playback and the normal playback may be performed according to a genre of a content being played back. Further, switching between the synchronous playback and the normal playback may be performed, for example, according to the processing capability of a terminal side that takes over the playback. Next, selection and switching of the synchronous playback and the normal playback will be described.

Figure 16:
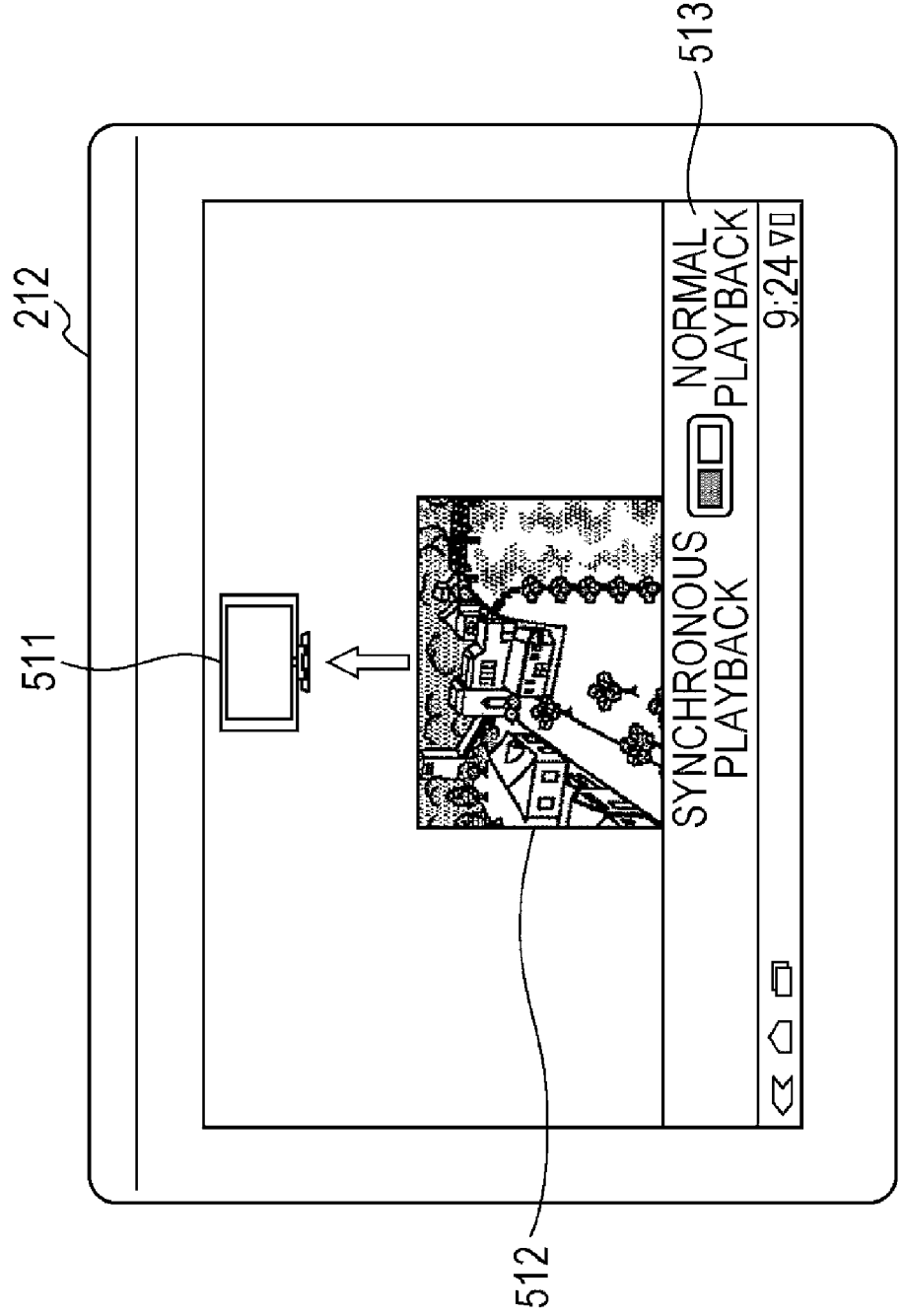
FIG. 16 is an exemplary screen displayed on a DMC device.

First, a configuration in which the user can select the synchronous playback and the normal playback will be described. FIG. 16 is an exemplary screen displayed on the DMC device 22 when the playback start request is output. A picture 511 representing a desired terminal that takes over the playback of a content, that is, the DMR device 23 is displayed on the upper portion of the display 212 of the DMC device 22. When the playback start request is output, the user can select a desired terminal that takes over the playback of a content, and the exemplary screen illustrated in FIG. 16 is a screen after the selection is made.

A video 512 of a content being played back is displayed on a central portion of the screen below the picture 511. A selection display section 513 through which either the synchronous playback or the normal playback can be selected is displayed on the lower right side of the video 512. An item representing "synchronous playback" and an item representing "normal playback" are displayed on the selection display section 513, and the example illustrated in FIG. 16 represents the state in which the item representing "synchronous playback" is selected.

The user can select a desired playback method by making a predetermined operation such as an operation of touching either of the item representing "synchronous playback" and the item representing "normal playback." When the selection display section 513 is displayed and the user makes the playback start request, the playback method may be selected.

Figure 17:
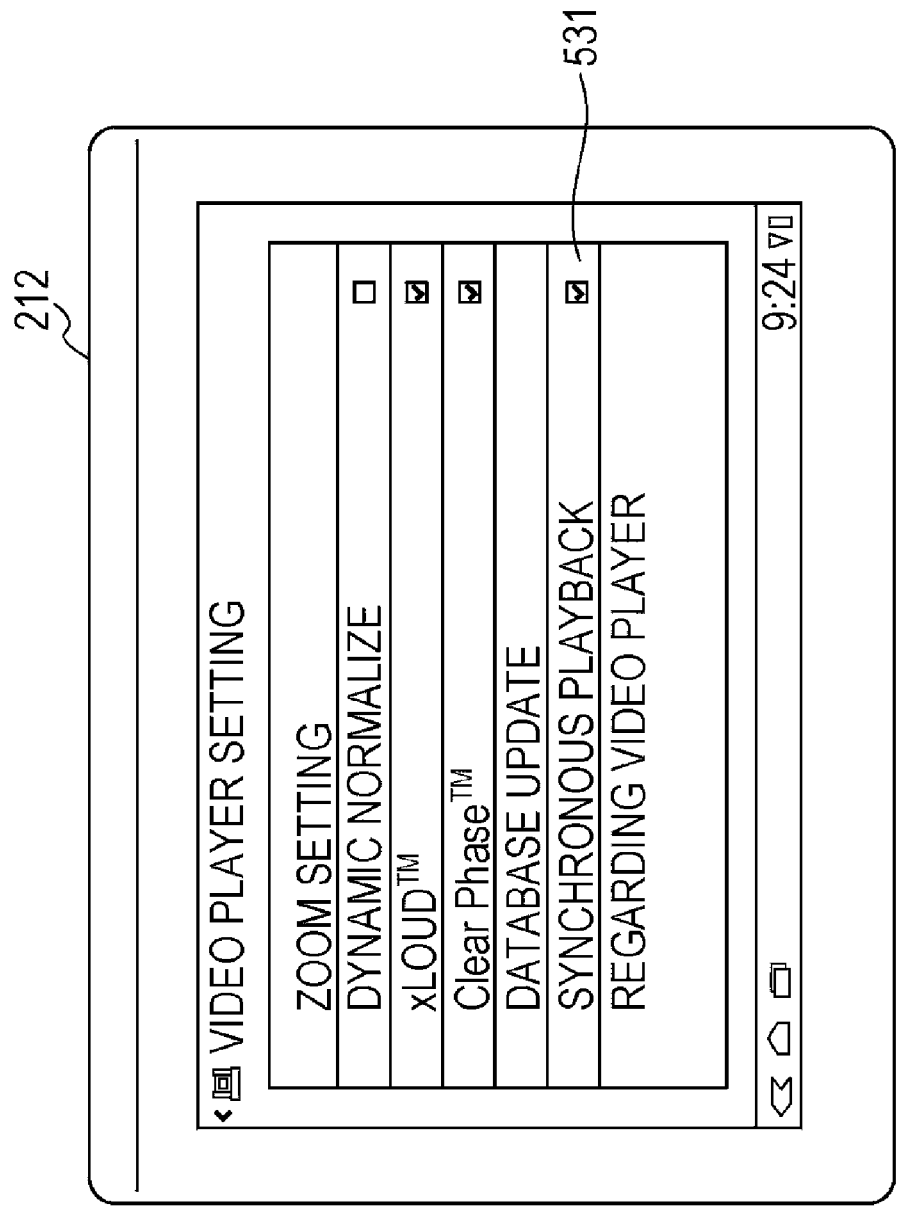
FIG. 17 is an exemplary screen displayed on a DMC device.

Further, instead of displaying the selection display section 513 each time the playback start request is output, for example, a menu screen illustrated in FIG. 17 may be displayed, and the user may be allowed to be able to select either the synchronous playback or the normal playback as a setting item of the playback method at the time of the playback.

For example, the menu screen illustrated in FIG. 17 is a screen displayed when menu items are selected on a playback screen on which a content is being played. As an item of the menu screen illustrated in FIG. 17, the item representing "synchronous playback" is displayed, and a check box 531 is displayed on the right side of the item representing "synchronous playback."

When the check box 531 displayed on the right side of the item representing "synchronous playback" is check-marked, the playback when the playback start request is output is set to the synchronous playback, whereas when the check box 531 is not check-marked, the playback when the playback start request is output is set to the normal playback.

When a setting is made on the setting screen, the next or subsequent playback is performed by the set playback method.

As described above, the user may set either of the synchronous playback and the normal playback.

Figure 18:
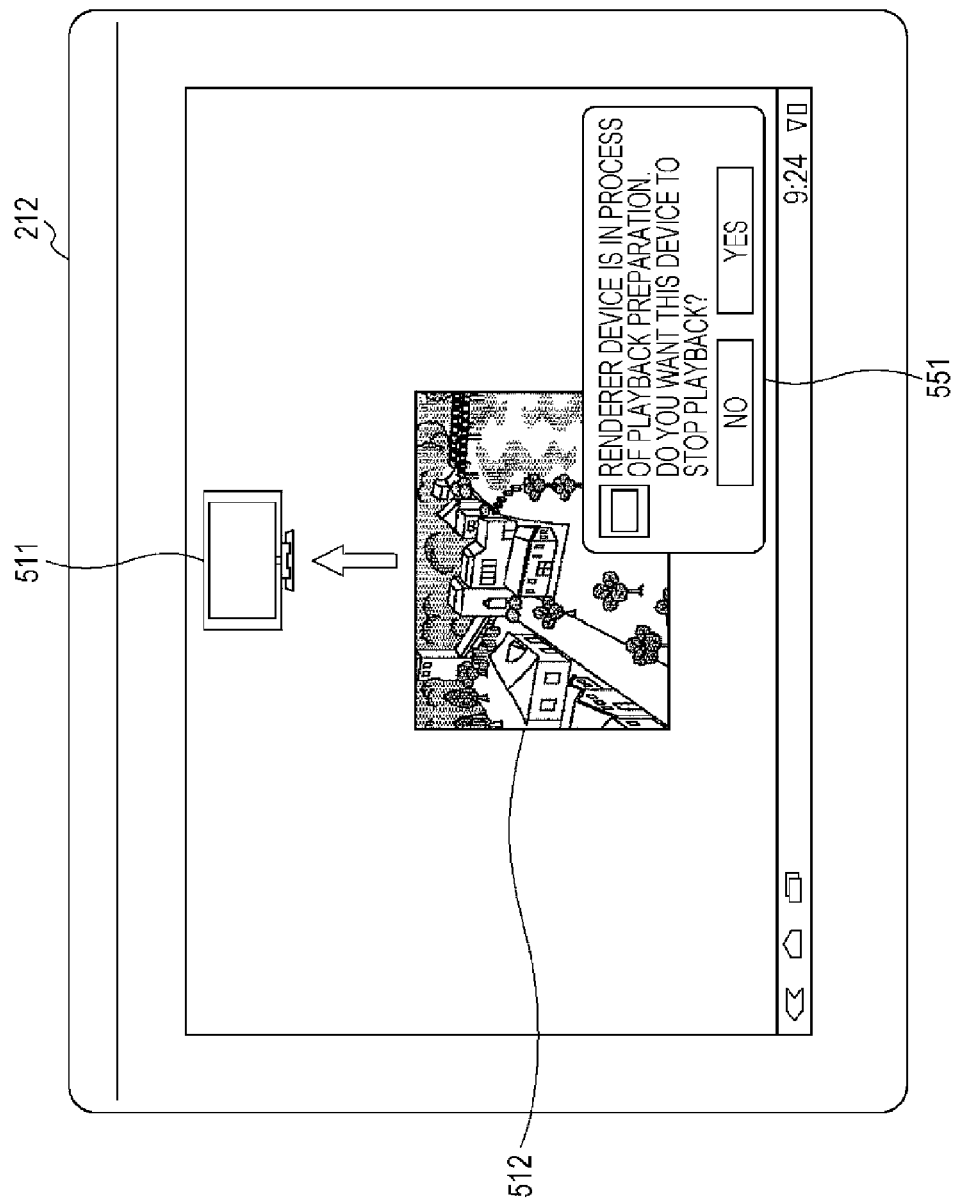
FIG. 18 is an exemplary screen displayed on a DMC device.

Further, the synchronous playback may be set to a default mode, and the synchronous playback may be performed when there is no instruction from the user, but when there is an instruction from the user, the playback may stop at a point in time at which the instruction is given regardless of whether or not playback preparation is completed in another device. For example, a selection display section 551 may be displayed as illustrated in FIG. 18.

The selection display section 551 is provided to the user when the playback start request is output, similarly to the exemplary screen illustrated in FIG. 16. A message representing "Renderer device is in process of playback preparation. Do you want this device to stop playback?" is displayed on the selection display section 551. Further, a button "No" and a button "Yes" are displayed below the message.

When the button "No" is operated or when the button operation is not made, the playback preparation is completed in the terminal to which the playback transitions, in this case, the DMR device 23, and then the playback starts, the synchronous playback is performed.

Meanwhile, when the button "Yes" is operated, the playback at the DMC device 22 stops at a point in time at which the button is operated. Then, after the playback preparation is completed in the DMR device 23, the DMR device 23 plays back the remaining part.

When the button "Yes" is operated in the state in which the synchronous playback is set to be performed, there may occur a difference between the playback position at which the playback stops at the DMC device 22 and the playback position at which the playback starts in the DMR device 23, and thus a part of the content may not be provided to the user. In this regard, when the button "Yes" is operated, the normal playback may be set to be performed.

Next, an example in which switching to the synchronous playback or the normal playback is performed according to a genre of a content being played back will be described. In this case, metadata included in a content is referred to, and the process is performed based on a genre of the content described in the metadata. For example, the DMC device 22 holds a table in which genres of contents set to the synchronous playback and genres of contents set to the normal playback are described, and selects either the synchronous playback and the normal playback with reference to the table.

For example, the table may be generated by a manufacturer when the DMC device 22 is manufactured, or the table may be generated by learning. When the table is generated in advance, for example, a content of musical preference is set such that the synchronous playback is performed since it is desirable that a song be played back without interruption nor overlapping.

When the table is generated by learning, the selection display section 513 illustrated in FIG. 16 is displayed when the playback start request is output, and selection of either of the synchronous playback and the normal playback is determined through the selection display section 513. At this time, a genre is determined based on metadata of the content. Then, the table is generated such that the playback selected by the user is associated with the genre. In this case, the table in which the user's preference is reflected can be generated.

As described above, either of the synchronous playback and the normal playback may be selected according to a genre.

Next, an example in which either of the synchronous playback and the normal playback is set according to a device of a playback transition destination will be described. Either of the synchronous playback and the normal playback is set according to a device of a playback transition destination, for example, the processing capability related to the playback of the DMR device 23.

When the processing capability of the DMR device 23 is high, the period of time related to the playback preparation at the DMR device 23 side is short. Thus, even when the normal playback is selected and the normal playback is performed, a period of time in which a content is not provided to the user is short in both the DMC device 22 and the DMR device 23. For this reason, the normal playback may be selected when the playback is performed in a device having a high processing capability, and the synchronous playback may be selected when the playback is performed in a device having a low processing capability.

Further, either of the synchronous playback and the normal playback may be set according to a type of a device of a playback transition destination, for example, a type of a device such as a video device or an audio playback device (speaker). For example, the normal playback may be set when a device of a playback transition destination is a video device, and the synchronous playback may be set when an audio playback device such as a speaker is a device of a playback transition destination.

As described above, as either of the synchronous playback and the normal playback is set by the user or without bothering the user, usability can be improved.

<Recording Medium>

A series of processes described above may be executed by hardware or software. When a series of processes is executed by software, a program configuring the software is installed in a computer. Here, examples of the computer include a computer in which dedicated hardware is incorporated and a general-purpose personal computer that executes various kinds of functions through various programs installed therein.

For example, a program executed by the content server 21 (the CPU 101) illustrated in FIG. 2 may be recorded in the removable medium 111 such as a package medium and provided. The program may be provided through a wired or wireless transmission medium such as a local area network, the Internet, or digital satellite broadcasting.

The program may be installed in the computer such that the removable medium 111 is mounted on the drive 110, and then the program is installed in the storage unit 108 through the I/O I/F 105. Further, the program may be received from a wired or wireless transmission medium through the communication unit 109 and then installed in the storage unit 108. Besides, the program may be installed in the ROM 102 or the storage unit 108 in advance.

The program executed by the computer may be a program in which a process is performed in time series according to the sequence described in this disclosure or a program in which a process is performed in parallel or at a necessary timing when called.

In this disclosure, a system represents an entire device configured with a plurality of devices.

The embodiments of the present technology are not limited to the above embodiments, and various changes can be made within the scope not departing from the gist of the present technology.

In addition, the present technology may have the following configurations.

(1) An information processing system, comprising: a control processing unit configured to cause playback of a selected content on a first display screen, receive a request to play back the selected content on a second display screen, request playback of the selected content on the second display screen, continue playback of the selected content on the first display screen after the request to play back the content on the second display screen is received, and automatically stop playback of the selected content on the first display screen during playback of the selected content on the second screen.

(2) The information processing system of (1), wherein playback of the selected content on the second screen begins at substantially a same position in the selected content as a position in the selected content being played back on the first screen.

(3) The information processing system of (1) or (2), wherein the control processing unit is further configured to provide a location of the selected content to the second screen, and provide a playback position to the second screen, the playback position identifying a position in the selected content where playback is to start on the second screen.

(4) The information processing system of any one of (1) to (3), wherein the control processing unit is further configured to detect a start of playback of the selected content on the second screen, determine a time period between the request of playback on the second screen and the start of playback on the second screen, and provide the second screen with an updated playback position based on the time period determined.

(5) The information processing system of any one of (3) to (4), wherein the control processing unit is further configured to send a mute instruction to the second screen to mute an audio of the selected content between provision of the playback position and provision of the updated playback position.

(6) The information processing system of (5), wherein the control processing unit is further configured to send an mute release instruction to the second screen after providing the second screen with the updated playback position.

(7) The information processing system of any one of (2) to (6), wherein the control processing unit is further configured to predict a delay time during which the second screen prepares for content playback, determine a playback position of the selected content based on the delay time, and provide the playback position of the selected content to the second screen prior to requesting playback of the selected content.

(8) The information processing system of (7), wherein the control processing unit is further configured to notify the second screen of the location of the selected content.

(9) The information processing system of (8), wherein the location of the selected content is notified as a Uniform Resource Identifier (URI).

(10) The information processing system according to claim 8, wherein the control processing unit is further configured to detect a start of playback of the selected content at the second screen, the stopping of playback of the selected content on the first screen being dependent upon detection of the playback start on the second screen.

(11) The information processing system of any one of (1) to (10), wherein the information processing system is a smart phone.

(12) The information processing system of any one of (1) to (11), wherein the control processing unit is further configured to display an indication that playback of the selected content has started on the second screen.

(13) The information processing system of (12), wherein the indication is displayed on the first screen.

(14) The information processing system of (13), wherein the indication is displayed on the first screen after playback of the selected content on the first screen has stopped.

(15) The information processing system of any one of (1) to (14), wherein the control processing unit is further configured to display, on the first screen, an indication that playback of the selected content on the second screen is being prepared.

(16) The information processing system of (15), wherein the indication that playback of the selected content on the second screen is being prepared is displayed on the first screen while the first screen continues playback of the selected content.

(17) The information processing system of (12), wherein the indication that playback of the selected content has started on the second screen includes an indication of when playback of the selected content on the first screen will end.

(18) The information processing system of (17), wherein the indication that playback of the selected content has started on the second screen includes an object to stop playback of the selected content on the first screen upon user interaction with the object.

(19) An information processing method, comprising: causing playback of a selected content on a first display screen, receiving a request to play back the selected content on a second display screen; requesting playback of the selected content on the second display screen; continuing playback of the selected content on the first display screen after the request to play back the content on the second display screen is received; and automatically stopping playback of the selected content on the first display screen during playback of the selected content on the second screen.

(20) A non-transitory computer-readable medium encoded with computer-readable instructions that when executed by a computer cause the computer to perform a method comprising: causing playback of a selected content on a first display screen; receiving a request to play back the selected content on a second display screen; requesting playback of the selected content on the second display screen; continuing playback of the selected content on the first display screen after the request to play back the content on the second display screen is received; and automatically stopping playback of the selected content on the first display screen during playback of the selected content on the second screen.

(21) An information processing system, comprising: a server configured to store content; a first device configured to play back content; a second device configured to playback content; and a network configured to interconnect the server, first device and second device, wherein when the first device receives a request to switch playback of a selected content from the first device to the second device, the first device: provides a content location of the selected content on the server to the second device via the network, sends, via the network, a request to the second device to start playback of the selected content, continues playback of the selected content after sending the request to the second device, and stops playback of the selected content during playback of the selected content on the second device; and the second device: receives, via the network, the location of the selected content on the server, receives, via the network, the request to start playback of the selected content, accesses, via the network, the selected content on the server, prepares playback of the selected content, and plays back the selected content.

In addition, the present technology may have the following configurations.

(1)
A playback device, including:
a playback control unit that controls a playback of a content,
wherein the playback control unit continuously performs the playback of the content during a predetermined period of time and then stops the playback of the content when an instruction to cause another device to take over the playback of the content is received.

(2)
The playback device according to (1), further including:
a notifying unit that acquires time information related to a period of time related to preparation for the playback of the content at the other device, decides a playback position of the content at which the playback starts in the other device based on the time information, and notifies the other device of the playback position of the content.

(3)
The playback device according to (2),
wherein the playback control unit stops the playback of the content when a predetermined period of time elapses after notification is given by the notifying unit.

(4)
The playback device according to any one of (1) to (3),
wherein a mute instruction is output when an instruction to play back the content is output to the other device, and
a mute release instruction is output when it is detected that the playback of the content has started in the other device.

(5)
The playback device according to any one of (1) to (4),
wherein null data is transmitted to the other device when an instruction to play back the content is output to the other device, and
transmission of the null data is stopped when it is detected that the playback of the content has started in the other device.

(6)
The playback device according to any one of (2) to (5),
wherein the time information is acquired before the instruction to cause the other device to take over the playback of the content is received, acquired from a device connected to a network, or acquired from the other device when the instruction to cause the other device to take over the playback of the content is received.

(7)
The playback device according to any one of (2) to (6),
wherein the time information is one of information when the other device is caused to play back a predetermined content, a period of time related to a process when predetermined data is transmitted to the other device, and information held in the other device as a processing time according to a size or a type of a content.

(8)
The playback device according to (7),
wherein the information held in the other device is updated when the other device plays back a content.

(9)
The playback device according to any one of (1) to (8),
wherein the other device calculates a period of time related to preparation for the playback of the content when an instruction to take over the playback of the content is received, decides a playback position based on the period of time, and starts the playback, and
the playback control unit stops the playback of the content when it is detected that the playback of the content has started in the other device or when a predetermined period of time elapses after it is detected that the playback of the content has started in the other device.

(10)

The playback device according to any one of (1) to (9), wherein the playback control unit controls a display of a message used to cause a user to recognize that playback preparation is being performed in the other device while the playback of the content is continuously being performed.

(11)

The playback device according to any one of (1) to (10), wherein the playback control unit controls a display causing a user to recognize a period of time taken until the playback of the content stops when it is detected that the playback of the content has started in the other device while the playback of the content is continuously being performed.

(12)

The playback device according to any one of (1) to (11), wherein switching between a first playback in which the playback of the content stops when an instruction to cause the other device to take over the playback of the content is received and a second playback in which the playback of the content stops when the playback of the content starts in the other device is performed according to a user's instruction, a genre of the content, or a processing capability of the other device.

(13)

A playback method of a playback device including a playback control unit that controls a playback of a content, the method including:
continuously performing, by the playback control unit, the playback of the content during a predetermined period of time and then stopping the playback of the content when an instruction to cause another device to take over the playback of the content is received.

(14)

A recording medium recording a computer readable program causing a computer, which controls a playback device including a playback control unit controlling a playback of a content, to execute a process of:
continuously performing, by the playback control unit, the playback of the content during a predetermined period of time and then stopping the playback of the content when an instruction to cause another device to take over the playback of the content is received.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-286724 filed in the Japan Patent Office on Dec. 28, 2012, the entire content of which is hereby incorporated by reference.

REFERENCE SIGNS LIST

10 Network
21 Content server
22 DMC device
23 DMR device
131 Network I/F
132 Content distribution processing unit
133 Content accumulating unit
250 Input operation receiving unit
251 Input operation determining unit
252 Control signal generating unit
253 Content display unit
254 Network I/F
255 Content reception processing unit
256 List generating unit
257 List display unit
258 Content playback unit
259 Storage unit
330 Network I/F
331 Content reception processing unit
332 Content decoding unit
333 Content playback unit
334 Content display unit
335 Content audio output unit

The invention claimed is:

1. An information processing system, comprising:
a control processing unit configured to:
cause playback of a selected content on a first display screen;
receive a request to playback the selected content on a second display screen;
send a request to the second display screen to playback the selected content on the second display screen;
send a first playback position to the second display screen, wherein the first playback position is a playback position in the selected content that is played back on the first display screen at an instance the request is sent to the second display screen;
send an instruction to the second display screen to start playback of the selected content from the first playback position;
continue playback of the selected content on the first display screen from the first playback position after the request to playback the selected content on the second display screen is sent to the second display screen;
transmit a null data to a server, wherein the second display screen is configured to acquire the transmitted null data from the server and playback the acquired null data from the first playback position of the selected content based on the instruction to start the playback of the selected content from the first playback position;
determine a time period between the instant at which the request is sent to the second display screen to playback the selected content and an instant of the start of playback of the null data from the first playback position on the second display screen;
send a second playback position to the second display screen, wherein the second playback position is a playback position in the selected content that is played back on the first display screen that corresponds to the determined time period;
cause the second display screen to start playback of the selected content from the second playback position; and
cause the first display screen to automatically stop the playback of the selected content at the second playback position upon the start of the playback of the selected content from the second playback position on the second display screen.

2. The information processing system according to claim 1, wherein the control processing unit is further configured to: detect the start of playback of the null data on the second display screen from the first playback position; and detect the start of playback of the selected content on the second display screen from the second playback position.

3. The information processing system according to claim 1, wherein the control processing unit is further configured to send a mute instruction to the second display screen to mute an audio of the selected content between the first playback position and the second playback position.

4. The information processing system according to claim 3, wherein the control processing unit is further configured to send a mute release instruction to the second display screen after the second playback position is provided to the second display screen.

5. The information processing system according to claim 1, wherein the control processing unit is further configured to:
predict a delay time required by the second display screen to prepare for content playback;
determine the second playback position of the selected content based on the predicted delay time; and
provide the determined second playback position of the selected content to the second display screen before the request to playback the selected content on the second display screen is sent to the second display screen.

6. The information processing system according to claim 1, wherein the control processing unit is further configured to notify the second display screen of a location of the selected content.

7. The information processing system according to claim 6, wherein the location of the selected content is notified as a Uniform Resource Identifier (URI).

8. The information processing system according to claim 1, wherein the control processing unit is further configured to detect the start of playback of the selected content from the second playback position on the second display screen, wherein the playback of the selected content on the first display screen is stopped based on the detection of the start of the playback from the second playback position on the second display screen.

9. The information processing system according to claim 1, wherein the information processing system is a smart phone.

10. The information processing system according to claim 1, wherein the control processing unit is further configured to display an indication that the playback of the selected content has started on the second display screen.

11. The information processing system according to claim 10, wherein the indication is displayed on the first display screen.

12. The information processing system according to claim 11, wherein the indication is displayed on the first display screen after the playback of the selected content on the first display screen has stopped.

13. The information processing system according to claim 1, wherein the control processing unit is further configured to display, on the first display screen, an indication that indicates preparation of the playback of the selected content on the second display screen.

14. The information processing system according to claim 13, wherein the indication that indicates the preparation of the playback of the selected content on the second display screen is displayed on the first display screen while the playback of the selected content is continued on the first display screen.

15. The information processing system according to claim 10, wherein the indication that the playback of the selected content has started on the second display screen comprises an indication of an instance at which the playback of the selected content on the first display screen will end.

16. The information processing system according to claim 15, wherein the indication that the playback of the selected content has started on the second display screen comprises an object to stop the playback of the selected content on the first display screen upon a user interaction with the object.

17. An information processing method, comprising:
causing playback of a selected content on a first display screen;
receiving a request to playback the selected content on a second display screen;
sending a request to the second display screen to playback the selected content on the second display screen;
sending a first playback position to the second display screen, wherein the first playback position is a playback position in the selected content that is played back on the first display screen at an instance the request is sent to the second display screen;
sending an instruction to the second display screen to start playback of the selected content from the first playback position;
continuing playback of the selected content on the first display screen from the first playback position after the request to playback the selected content on the second display screen is sent to the second display screen;
transmitting a null data to a server, wherein the second display screen is configured to acquire the transmitted null data from the server and playback the acquired null data from the first playback position of the selected content based on the instruction to playback of the selected content;
determining a time period between the instant at which the request is sent to the second display screen to playback the selected content and an instant of the start of playback of the null data from the first playback position on the second display screen;
sending a second playback position to the second display screen, wherein the second playback position is a playback position in the selected content that is played back on the first display screen that corresponds to the determined time period;
causing the second display screen to start playback of the selected content from the second playback position; and
causing the first display screen to automatically stop the playback of the selected content at the second playback position upon the start of the playback of the selected content from the second playback position on the second display screen.

18. A non-transitory computer-readable medium having stored thereon, computer-executable instructions for causing a computer to execute operations, the operations comprising:
causing playback of a selected content on a first display screen;
receiving a request to playback the selected content on a second display screen;
sending a request to the second display screen to playback the selected content on the second display screen;
sending a first playback position to the second display screen, wherein the first playback position is a playback position in the selected content that is played back on the first display screen at an instance the request is sent to the second display screen;

sending an instruction to the second display screen to start playback of the selected content from the first playback position;

continuing playback of the selected content on the first display screen from the first playback position after the request to playback the selected content on the second display screen is sent to the second display screen;

transmitting a null data to a server, wherein the second display screen is configured to acquire the transmitted null data from the server and playback the acquired null data from the first playback position of the selected content based on the instruction to playback of the selected content;

determining a time period between the instant at which the request to is sent the second display screen to playback the selected content and an instant of the start of playback of the null data from the first playback position on the second display screen;

sending a second playback position to the second display screen, wherein the second playback position is a playback position in the selected content that is played back on the first display screen that corresponds to the determined time period;

causing the second display screen to start playback of the selected content from the second playback position; and causing the first display screen to automatically stop the playback of the selected content at the second playback position upon the start of the playback of the selected content from the second playback position on the second display screen.

* * * * *